(12) United States Patent
Coles et al.

(10) Patent No.: US 9,720,173 B2
(45) Date of Patent: Aug. 1, 2017

(54) PRINTING OF LIQUID CRYSTAL DROPLET LASER RESONATORS ON A WET POLYMER SOLUTION AND PRODUCT MADE THEREWITH

(71) Applicant: Johnson Matthey PLC, London (GB)

(72) Inventors: Harry Coles, Ely (GB); Ian Hutchings, Cambridge (GB); Damian Gardiner, Cambridge (GB); Wen-Kai Hsiao, Cambridge (GB); Philip Hands, Edinburgh (GB); Stephen Morris, Cambridge (GB); Timothy Wilkinson, Willingham (GB)

(73) Assignee: Johnson Matthey PLC, Cleveland (GB)

( * ) Notice: Subject to any disclaimer, the term of this patent is extended or adjusted under 35 U.S.C. 154(b) by 0 days.

(21) Appl. No.: 15/266,135

(22) Filed: Sep. 15, 2016

(65) Prior Publication Data
US 2017/0059775 A1    Mar. 2, 2017

Related U.S. Application Data

(63) Continuation of application No. 14/402,292, filed as application No. PCT/GB2013/051368 on May 24, 2013, now Pat. No. 9,482,815.

(30) Foreign Application Priority Data

May 25, 2012  (GB) .................................. 1209235.9
Aug. 13, 2012  (GB) .................................. 1214439.0

(51) Int. Cl.
*G02F 1/13*     (2006.01)
*C09K 19/02*    (2006.01)
(Continued)

(52) U.S. Cl.
CPC .............. *G02B 6/1225* (2013.01); *B41J 2/01* (2013.01); *H01S 3/094034* (2013.01);
(Continued)

(58) Field of Classification Search
CPC .... G02B 6/1225; B41J 2/01; H01S 3/094034; H01S 3/1686
See application file for complete search history.

(56) References Cited

U.S. PATENT DOCUMENTS 4,660,058 A * 4/1987 Cordery ..................... B41J 2/07
                                                         347/100
5,958,119 A     9/1999 Malhotra et al.
(Continued)

FOREIGN PATENT DOCUMENTS

CN    102053424 A    5/2011
EP    0903383        3/1999
(Continued)

OTHER PUBLICATIONS

Seki, et al. (1989) Macromolecules 22:3506-3508, "Photochemical Alignment Regulation of a Nematic Liquid Crystal by Langmuir-Blodgett Layers of Azobenzene Polymers as "Command Surfaces"".

(Continued)

*Primary Examiner* — Donald Raleigh
(74) *Attorney, Agent, or Firm* — Swanson & Bratschun, L.L.C.

(57) ABSTRACT

A method of manufacturing a security feature for identifying objects or documents of value. The method may include the steps of encoding information in a pattern; and ink jet printing a chiral nematic liquid crystal material from a reservoir using a print head on to a substrate in the pattern. Thus, the method forms a patterned array of chiral nematic liquid crystal material deposits. The print head, or the (Continued)

reservoir, or both, may be heated to a temperature above the clearing point of the chiral nematic liquid crystal material. The chiral axes of the chiral nematic liquid crystal material deposits may be aligned substantially perpendicular to the substrate such that a predetermined portion of the electromagnetic spectrum is selectively reflected over other regions of the electromagnetic spectrum by the chiral nematic liquid crystal material deposits.

7 Claims, 10 Drawing Sheets

(51) Int. Cl.

| G02B 6/122 | (2006.01) |
|---|---|
| H01S 3/094 | (2006.01) |
| H01S 3/16 | (2006.01) |
| B41J 2/01 | (2006.01) |
| G02F 1/1341 | (2006.01) |
| H01S 3/08 | (2006.01) |

(52) U.S. Cl.
CPC .. *H01S 3/1686* (2013.01); *G02F 2001/13415* (2013.01); *G02F 2202/36* (2013.01); *H01S 3/08036* (2013.01); *H01S 3/094076* (2013.01)

(56) References Cited

U.S. PATENT DOCUMENTS

| 6,027,555 | A | 2/2000 | Malhotra et al. | |
|---|---|---|---|---|
| 6,181,393 | B1 | 1/2001 | Enomoto et al. | |
| 8,426,011 | B2 | 4/2013 | Tiller et al. | |
| 8,426,012 | B2* | 4/2013 | Tiller | B41M 3/14 252/299.01 |
| 8,426,014 | B2* | 4/2013 | Tiller | B41M 3/14 235/454 |
| 8,481,146 | B2 | 7/2013 | Bastiaansen et al. | |
| 8,556,404 | B2 | 10/2013 | Nakane | |
| 8,734,679 | B2 | 5/2014 | Marguerettaz et al. | |
| 8,740,088 | B2 | 6/2014 | Marguerettaz et al. | |
| 8,815,000 | B1 | 8/2014 | Sacripante et al. | |
| 2001/0036212 | A1 | 11/2001 | Kopp et al. | |
| 2005/0008057 | A1* | 1/2005 | Leyrer | C08F 291/00 372/53 |
| 2008/0062376 | A1 | 3/2008 | Ko et al. | |
| 2008/0137025 | A1* | 6/2008 | Ueda | G02F 1/1303 349/155 |
| 2008/0225209 | A1 | 9/2008 | Higa | |
| 2009/0141060 | A1 | 6/2009 | Kwon et al. | |
| 2010/0002731 | A1 | 1/2010 | Kimura et al. | |
| 2010/0038598 | A1* | 2/2010 | Bastiaansen | C09D 11/101 252/500 |
| 2010/0178508 | A1* | 7/2010 | Kasch | C09K 19/38 428/402 |
| 2011/0097557 | A1 | 4/2011 | May | |
| 2011/0100546 | A1* | 5/2011 | Jang | C09K 19/02 156/277 |
| 2011/0101088 | A1* | 5/2011 | Marguerettaz | B41M 7/0081 235/375 |
| 2012/0061470 | A1* | 3/2012 | Marguerettaz | G06K 19/06046 235/454 |

FOREIGN PATENT DOCUMENTS

| EP | 2285587 | 2/2011 |
|---|---|---|
| EP | 2509792 | 10/2012 |
| EP | 2509794 | 10/2012 |
| EP | 2509795 | 10/2012 |
| WO | WO 2005/019915 | 3/2005 |
| WO | WO 2005/019916 | 3/2005 |

OTHER PUBLICATIONS

International Search Report and Written Opinion dated Sep. 4, 2013 for Corresponding International Patent Application No. PCT/GB2013/051368.
Chinese Office Action dated Nov. 16, 2015 for corresponding Chinese Patent Application No. 201380039406.4.
Kopp et al. (1998) Optics Letters 23(21):1707-1709, "Low-threshold lasting at the edge of a photonic stop in cholesteric liquid crystals".
Coles and Morris (2010) Nature Photonics 4:676-685, "Liquid-crystal lasers".
Morris, et al. (2008) Optics Express 16(23): 18827-18837, "Polychromatic liquid crystal laser arrays towards display applications".
Yang, et al. (1997) Annu. Rev. Mater. Sci. 27:117-46, "Bistable Cholesteric Reflective Displays: Materials and Drive Schemes".
Mowatt, et al. (2010) Journal of Applied Physics 107:043101, "Comparison of the performance of photonic band-edge liquid crystal lasers using different dyes as the gain medium".
Chanishvili, et al. (2005) Applied Physics Letters 86:051107, "Widely tunable ultraviolet-visible liquid crystal laser".
Chanishvili, et al. (2004) Advanced Materials 16:9-10, "Lasing in Dye-Doped Cholesteric Liquid Crystals: Two New Tuning Strategies".
Hands, et al. (2011) Liquid Crystals XV Proc. SPIE 8114-28, "Wavelength-tuneable liquid crystal lasers from the visible to the near-infrared".
Sonoyama, et al. (2007) Japanese Journal of Applied Physics 46(36):L874-L876, "Position-Sensitive Cholesteric Liquid Crystal Dye Laser Covering a Full Visible Range".
Gardiner, et al. (2011) Optics Express 19(3):2432, "Paintable band-edge liquid crystal lasers".
Hands, et al. (2011) Applied Physics Letters 98:141102, "Band-edge and random lasing in paintable liquid crystal emulsions".
Morris, et al. (2005) Proceedings of SPIE 5741:118-128, "Liquid crystal lasers: coherent and incoherent micro-sources".
Hon, et al. (2008) CIRP Annals—Manufacturing Technology 57:601-620, "Direct writing technology—Advances and developments".
Martin, et al. (2008) Journal of Physics: Conference Series 105:012001, "Inkjet printing—the physics of manipulating liquid jets and drops".
Hsiao, et al. (2009) Journal of Imaging Science and Technology 53(5):050304-050304-8, "Ink Jet Printing for Direct Mask Deposition in Printed Circuit Board Fabrication".
Drzaic & Muller (1989) Liquid Crystals 5(5):1467-1475, "Droplet Shape and reorientation fileds in nematic droplet/polymer films".
Drzaic, et al. (1989) Liquid Crystal Chemistry, Physics and Applications SPIE vol. 1080, "High Brightness and Color Contrast Display Constructed from Nematic Droplet/Polymer Films Indorporating Pleochroic Dyes".
Morris, et al. (2006) Journal of the SID 14(6):565, "The emission characteristics of liquid-crystal lasers".
Schmidtke and Stille (2003) The European Physical Journal B 31:179-194, "Fluorescence of a dye-doped cholesteric liquid crystal film in the region of the stop band: theory and experiment".
Hands, et al. (2008) Optics Letters 33(5):515-517, "Two-dimensional liquid crystal laser array".

* cited by examiner

PRINTING OF LIQUID CRYSTAL DROPLET LASER RESONATORS ON A WET POLYMER SOLUTION AND PRODUCT MADE THEREWITH

RELATED APPLICATIONS

This application is a continuation of U.S. patent application Ser. No. 14/402,292 filed Nov. 19, 2014, entitled "PRINTING OF LIQUID CRYSTAL DROPLET LASER RESONATORS ON A WET POLYMER SOLUTION AND PRODUCT MADE THEREWITH," which claims priority to 35 USC §371 of PCT Application Serial No. PCT/GB2013/051368, filed May 24, 2013, entitled "Methods for Manufacturing Photonic Devices," which claims priority to GB Patent Application No. 1209235.9, filed May 25, 2012, and GB Patent Application No. 1214439.0, filed Aug. 13, 2012, which are each incorporated herein in their entirety by reference.

BACKGROUND TO THE INVENTION

Field of the Invention

The present invention relates to methods for manufacturing photonic devices and to photonic devices manufactured by such methods. The invention has particular, but not exclusive, application to the manufacture of liquid crystal laser devices.

Related Art

Liquid crystal (LC) materials are a class of functional photonic materials. LC materials contain molecules which have a tendency to self-organize along an optical axis. The way in which the molecules in LC materials align dictates the optical properties of the LC material. For example, chiral liquid crystals have a tendency to self-organize into a helicoidal arrangement around an optical axis. Due to the birefringence of the material, this helicoidal arrangement results in a periodic variation of the refractive index along the optical axis. For suitable periodicities, this gives rise to a photonic band-gap for visible wavelengths of circularly polarized light.

The optical properties of chiral LC materials make them suitable for applications ranging from bistable displays to lasers. Incorporation of an organic laser dye, as the light harvester or gain medium, into the optical cavity can lead to laser emission at the photonic band-edges. Laser devices built based on these materials are characterised by very low cost manufacturing, small size and selectable wavelength of emission, currently in the range 400 nm to 850 nm (See References [4] and [2]).

Applications of achiral LC materials include conventional flat-panel displays (nematic LCDs), variable retarders and SLMs.

US2011/0097557 discloses the manufacture of security features, e.g. for bank notes, in which a polymerisable LC material is printed onto a solid PVA layer. The PVA layer is unrubbed but is found to promote alignment for certain LC materials.

Conventional semiconductor lasers used in most modern laser systems are solid-state devices that are typically manufactured using a complex process involving a combination of deposition, etching and photolithographic steps on high quality single crystal semiconductor wafers. Such conventional lasers cannot be manufactured using relatively low cost printing technologies such as bar coating or inkjet printing, for example. It has previously been shown in References [11] and [12] that printable emulsion-based LC laser systems can be deposited on a wide variety of substrates including, for example, glass, plastic, metal or paper. These documents describe deposition of a LC lasing medium onto suitable substrates using emulsified samples and a simple bar-coating process. In these disclosures, the liquid crystal and laser dye composition were emulsified in a continuous phase of PVA, this emulsion then being applied to the substrate. Subsequent drying of, and interfacial interaction with, the continuous phase causes advantageous stresses to be applied to the LC droplets, assisting in the development of suitable alignment of the LC molecules.

SUMMARY OF THE INVENTION

The present inventors have found that although the approach described by References [11] and [12] provides a simple fabrication process, the approach has some disadvantages. The individual LC droplets are polydisperse in terms of size, typically with diameters in the range of tens to hundreds of microns. This has an effect on the quality of the laser emission. Furthermore, the droplets are locally randomly distributed in the continuous phase. Therefore the approach used in References [11] and [12] does not allow accurate positioning of individual droplets, with the consequence that the spatial position of the emission of light from the device cannot be accurately controlled.

Accordingly, the present inventors attempted to overcome the above disadvantages by depositing patterns of LC lasing medium. The present inventors found that it is indeed possible to produce a required pattern of deposits of LC lasing medium, for example by inkjet printing. However, the present inventors have found that direct deposition of the LC lasing medium onto clean, dry surfaces fails to produce a suitable degree of alignment of the LC molecules (for example, a suitable alignment for many devices that use chiral LC materials is one in which the chiral LC helical axis is aligned perpendicular to the substrate).

Control of alignment within LC materials is known to be important to allow the desired optical properties of the LC material for a particular application to be obtained. For example, flat-panel display devices comprising nematic LC require a uniform direction of the LC director i.e. alignment of the LC material, for the display to function. For example, lack of uniform alignment within a deposited LC material for use as a lasing medium can result in multi-mode laser emission, or even no laser emission, which is typically undesirable.

The present invention has been devised in order to address at least one of the above problems. Preferably, the present invention reduces, ameliorates, avoids or overcomes at least one of the above problems.

In a general aspect of the invention, the present inventors have found that it is advantageous to deposit a liquid crystal (LC) material onto a flowable layer of material that is substantially immiscible with the LC material. Furthermore, the present inventors have found that further advantages can be achieved when, on impact of the LC material, the flowable layer of material shapes the LC material with the result of promoting alignment of molecules in the LC material.

In a first preferred aspect, the present invention provides a method of producing photonic devices, such as lasers, or optical features by depositing liquid crystal (LC) materials in one or more discrete regions on surfaces.

In a second preferred aspect, the present invention provides a method of manufacturing a photonic device, the method comprising the steps of:

(i) providing an aliquot of a liquid crystal (LC) material of volume V, volume V being the same volume as that of a sphere of diameter D1; and (ii) depositing the aliquot onto the surface of a flowable material layer to form a liquid crystal deposit, the flowable material and the LC material being substantially immiscible, wherein the liquid crystal deposit adopts a deformed shape relative to the shape of the aliquot due to interaction with the flowable material layer, the liquid crystal deposit having a maximum length L1, measured in a direction parallel to the flowable material layer surface before deposition, wherein L1 is greater than D1.

In a third preferred aspect, the present invention provides a photonic device obtained by or obtainable by the method of the first or second aspect.

In a fourth preferred aspect, the present invention provides a laser device obtained by or obtainable by the method of the first or second aspect.

In a fifth preferred aspect, the present invention provides a photonic device having at least one liquid crystal (LC) material deposit formed on an underlayer, the underlayer having an underlayer surface surrounding the LC material deposit, wherein the liquid crystal deposit has a maximum length L2, measured in a direction parallel to the underlayer surface surrounding the LC material deposit, and a maximum height H2, measured in a direction perpendicular to the underlayer surface surrounding the LC material deposit, so that L2 is greater than H2, wherein the liquid crystal deposit is shaped to project above the underlayer surface surrounding the LC material deposit.

In a sixth preferred aspect, the present invention provides a use of a photonic device according to the third or fifth aspect, in which the photonic device is subjected to illumination by a source of electromagnetic radiation and provides a corresponding response which is detected by a detector or by observation.

Any of the aspects of the invention may be combined with each other.

Any of the aspects of the invention may have any one or, to the extent that they are compatible, any combination of the following optional features.

The term liquid crystal (LC) material as used herein describes a material containing at least 50 wt. %, preferably at least 75 wt. %, more preferably at least 90 wt. % of at least one chemical compound that exhibits liquid crystalline behaviour. Optionally the LC material contains a plurality of chemical compounds known to exhibit liquid crystalline behaviour. Preferably the LC material contains elongated molecules.

Suitably the LC material is a chiral LC material, that is a material containing at least 50 wt. %, preferably at least 75 wt. %, more preferably at least 90 wt. % of at least one chemical compound that exhibits liquid crystalline behaviour and a chiral additive, for example BDH-1281. The addition of a chiral additive allows the chirality of the LC material to be controlled by controlling the periodicity of the variation in refractive index in the LC material. Suitable chiral additives are described in U.S. Pat. No. 6,217,792 and WO 2011/137986. Suitably the chiral LC material contains less than 10 wt. % of chrial additive. Preferably the chiral LC material contains about 2 wt. % to 6 wt. % of chiral additive. Chiral LC materials have a tendency to align in a helicoidal arrangement. Chiral LC materials are particularly suitably for the formation of a band-edge laser. Alternatively the chiral LC material contains a chiral chemical compound known to exhibit liquid crystalline behaviour.

The LC material may be one, or more, of nematic, chiral nematic, smectic or blue phase materials. Chiral nematic materials are particularly preferred.

Suitably the LC materials form a laser. Preferably the LC material exhibits photonic band-edge lasing. Alternatively the LC material may exhibit random lasing.

Optionally the LC material includes a fluorescence dye, a fluorescent laser dye, a quantum dot, or other light harvester or gain additives, such as Nd:YAG, Ti:sapphire, Cr:sapphire, Cr:LiSAF Er:YLF, Nd:glass, and Er:glass. to allow the LC material to function as a lasing medium.

Suitably the LC material exhibits a nematic phase. A chiral LC material exhibiting a nematic phase is particularly suitable for the formation of a band-edge laser. However, these materials may also be used to form a random laser.

Optionally the LC material exhibits a smectic phase. Chiral smectic LC materials are suitable for the formation of a band-edge laser and may also be used to form a random laser.

Optionally the LC material exhibits a blue phase I, II or III. Blue phase materials are particularly suitable for the formation of a band-edge laser.

In alternative embodiments, it is not necessary for the LC material to form a laser. This is the case where, for example, it is intended that the photonic device is a passive device. Suitable passive devices include, for example, Bragg-like reflectors, where a known portion of the electromagnetic spectrum is selectively reflected over other regions of the spectrum.

Preferably the aliquot of liquid crystal material is provided by inkjet printing. To overcome the problem of providing accurate spatial positioning, the present inventors have developed an inkjet-based process which can preferably be used to construct arrays of LC lasers or other photonic devices whilst preserving the desirable emission characteristics.

The method of the present invention may be used to construct patterned arrays of liquid crystal material deposits, for example a pre-designed complex two dimensional pattern. The patterned array may also be a regular array of liquid crystal deposits.

The photonic device of the present invention may have a plurality of liquid crystal deposits in a regular and/or patterned array.

Optionally the liquid crystal deposit is shaped to project above and below the flowable material layer (or underlayer surface) surrounding the LC material deposit.

Optionally the flowable material layer at least partially encapsulates the LC deposit. Where, for example, the LC deposit adopts a lenticular shape, the flowable material layer may encapsulate one of the major convex surfaces of the lenticular shape.

The additional advantage of using an inkjet process is the flexibility in not only depositing the laser materials themselves, with controllable emission characteristics, but that further additive processing is made significantly easier. Thus, for example, further materials can be deposited via inkjet printing. The flowable material layer may be deposited via inkjet printing (before deposition of the LC material). Other materials may also be deposited in this way, such as other polymeric layers to assist with or provide protection of the LC material and/or improve alignment within the LC material.

The length L1 of the liquid crystal deposit is the maximum distance across the liquid crystal deposit on the flowable material layer, measured along a straight line parallel to the flowable material layer surface. For example, when the liquid crystal deposit is a substantially circular island when viewed in plan view, L1 is the diameter of the island.

The liquid crystal deposit has a minimum width W1. The width W1 of the liquid crystal deposit is the minimum distance across the liquid crystal deposit on the flowable material layer, measured along a straight line parallel to the flowable surface and passing through the centre point (or centroid) of the liquid crystal deposit when viewed in plan view. Here, the surface of the flowable material layer is considered before deposit of the LC material deposit. For example, when the liquid crystal deposit is a substantially circular island when viewed in plan view, W1 is the diameter of the island.

The width W2 of the liquid crystal deposit is the minimum distance across the liquid crystal deposit on the support layer (or underlayer), measured parallel to the support layer surface (or the underlayer surface) surrounding the LC deposit, in a similar manner to W1. W2 may be different to W1 due to a transformation of the flowable material layer to the support layer (or underlayer).

The length L2 of the liquid crystal deposit is the maximum distance across the liquid crystal deposit on the support layer (or the underlayer), measured parallel to the support layer surface (or the underlayer surface) surrounding the LC deposit. For example, when the liquid crystal deposit is a substantially circular drop, L2 is the diameter of the drop. L2 may be different to L1 due to a transformation of the flowable material layer to the support layer (or underlayer).

The length L1 can be measured via static image microscopy after deposition of the deposit. The length L2 can be measured via static image microscopy after the step of transforming the flowable material layer into the support layer.

The width W1 can be measured via static image microscopy after deposition of the deposit. The width W2 can be measured via static image microscopy after the step of transforming the flowable material layer into the support layer.

The diameter D1 can also be measured via microscopy. In the case of inkjet printing, D1 can be measured via video microscopy by capturing images of the generated drop after generation from an inkjet nozzle but before deposition at the flowable material layer. Alternatively, for other deposition processes, D1 can be calculated based on knowledge of the volume V of the aliquot of LC material.

The height H1 of the LC material deposit is the maximum height of the liquid crystal deposit measured perpendicular to the flowable material layer surface. Here, the surface of the flowable material layer is again considered before deposit of the LC material deposit.

The height H2 of the liquid crystal deposit is the maximum height of the LC material deposit measured perpendicular to the support layer surface (or the underlayer surface) surrounding the LC material deposit.

The height H1 and H2 of the liquid crystal deposit can also be measured via static image microscopy after deposition of the drop. The height H1 and H2 can also be measured using SEM.

To overcome the problem of poor alignment within the LC material, the present inventors have developed an approach taking advantage of the fact that certain flowable materials can be identified and selected in which the LC materials are not substantially miscible. For example suitable LC materials tend not to be miscible in polymer solutions such as aqueous PVA. This is demonstrated in References [9], [11] and [12], in which an emulsion of the LC material phase in a continuous phase of aqueous PVA is formed. The present inventors have found that when the droplets of the LC phase are smaller in volume than the flowable material, e.g. the polymer solution, as in the case of small deposits on a flowable material layer, e.g. a wet film, the interfacial tension stresses and distorts the LC phases (deposits). The effect of this is to promote the desired alignment of the LC molecules in the liquid crystal deposit.

The present inventors have found that inkjet printing of a LC material allows for accurate spatial positioning of the LC material on the surface on which it is printed. Inkjet printing of a LC material onto a flowable material that is substantially immiscible with the LC material improves the spatial positioning of LC material on the surface and also improves alignment within the LC material. The substantial immiscibility of the two materials means that the materials form distinctive phases when placed in contact with one another. Where the LC material deposit has a circular shape in plan view, the interfacial tension between the LC material and the flowable material layer shapes the deposit of the LC material to have a diameter D2 which is greater than the diameter D1 of a sphere with the same volume V as the aliquot of LC material deposited. This distortion induces alignment of molecules within the LC material. The non-contact and "self-assembly" nature of this method allows for low-cost and flexible manufacturing of photonic devices on a broad range of surfaces. This method also allows for precise control of patterning along with control over the photonic property of the LC material by inducing alignment in the LC material.

Suitably the volume of flowable material in the flowable material layer is greater than the volume of LC material deposited by inkjet printing in the process of the present invention. Preferably, the depth of the flowable material layer (or underlayer) is greater than the maximum height H1 and/or H2 of the LC material deposit. More preferably, the depth of the flowable material layer (or underlayer) is greater than the diameter D1 of a sphere with the same volume V as the aliquot of LC material.

Preferably H2 is greater than 1 µm, preferably greater than 5 µm. Preferably H2 is less than 100 µm. Preferably H2 is in the range 1 µm to 100 µm, more preferably 5 µm to 50 µm and most preferably in the range 5 µm to 30 µm.

Preferably the ratio of H1 to H2 is not less than 1:1.
Preferably the ratio of H1 to H2 is not more than 50:1.
A deposit of LC material having H2 within the values described above is considered to be particularly suitable for use as a laser due to the resultant length of lasing cavity.
Preferably the ratio D1 to H1 is less than 50:1.
Preferably the ratio of L2 to H2 is from 2:1 to 200:1.
Preferably, the ratio of L1 to D1 is not more than 20:1, preferably less than 10:1, and most preferably less than 3:1.
Preferably, the ratio of L1 to H1 is not less than 1:1.
Preferably, the ratio of L1 to H1 is not more than 50:1.
Preferably, the ratio of L2 to H2 is not less than 1.1:1
Preferably, the ratio of L2 to H2 is not more than 1000:1.
Preferably the ratio of W1 to D1 is not less than 0.1:1.
Preferably the ratio of W1 to D1 is not more than 20:1
Preferably the ratio of W1 to W2 is not more than 1:1.
Preferably the ratio of W1 to W2 is not less than 0.01:1.
Preferably the ratio of L1 to W1 is not less than 1:1.
Preferably the ratio of L1 to W1 is not more than 200:1.
Preferably the ratio of L2 to W2 is not less than 1:1.
Preferably the ratio of L2 to W2 is not more than 1000:1.

The present inventors have found that operating within the ranges identified above tends to promote alignment of the LC material in the LC material deposit, due to shaping effects caused by interaction with the flowable material layer.

In some embodiments, LC materials are deposited by inkjet printing onto a liquid layer. The liquid layer here is an example of the flowable material layer of the second aspect of the invention.

In some embodiments, the liquid layer is deposited by film coating using a doctor blade, or bar coating, or roll-coating or inkjet deposition of either a continuous wet film (e.g. solution layer), individual drops, groups of connected drops, or multiple drops in the same location.

Suitably the method comprises a step of transforming the flowable material layer into a support layer. Typically, this takes place after deposition of the LC material drop. Optionally the step of transforming the flowable material layer includes curing the flowable material layer to form a support layer. The step of transforming the flowable material layer into a support layer may involve any chemical or physical process which may convert, e.g. a liquid, into a solid or a semi-solid. Optionally the step of transforming the flowable material layer involves cooling (e.g. solidification), solvent evaporation, cross-linking, or polymerization (such as photo induced polymerization) of the flowable material layer. When the flowable material is a solution, transformation into the support layer may involve evaporation of some or all of the solvent from the solution. The transformation of the flowable material layer into a support layer provides the advantage that the LC material can be supported at a desired location within the support layer. Therefore, the support layer preferably prevents movement of the LC material drop from the desired location, e.g. during movement or vibration of the photonic device.

The step of transforming the flowable material layer into a support layer may also involve shrinking the flowable material layer. For example, when the flowable material is a solution, evaporation of the solvent to form the support layer may also result in shrinking of the flowable material layer. Shrinking of the flowable material may further distort the drop of the LC material to further improve alignment of molecules within the LC material.

The step of transforming the flowable material layer into a support layer may also involve distorting the LC material deposit. The maximum length of the LC material deposit after the step of transforming the flowable material layer into the support layer is L2. The maximum height of the LC material deposit after the step of transforming the flowable material layer into the support layer is H2.

In some embodiments the maximum length of the LC material deposit increases during the transformation of the flowable material layer into the support layer such that L2 is greater than L1. This further improves alignment within the LC material.

In some embodiments the maximum height of the LC material deposit decreases during the transformation of the flowable material layer into the support layer such that H2 is less than H1. This further improves alignment within the LC material.

Optionally, after the transformation of the flowable material layer into a support layer, the ratio of the maximum length L2 of the LC material deposit on the support layer to the diameter D1 of the sphere having the same volume V as the aliquot of LC material is preferably less than 20:1, more preferably less than 10:1, and most preferably less than 3:1.

Suitably the method comprises the step of curing the LC material deposit. The step of curing the LC material may include photopolymerization of reactive monomers, for example when liquid crystalline mono- and di-acrylate materials are contained in the LC material or where the LC material itself is polymerizable. Curing the deposited drop of LC material prevents disruption of the improved alignment achieved by the method of the present invention, e.g. during movement or vibration of the photonic device.

Suitably the flowable material is a liquid. Preferably the liquid is a solution, for example a polymer solution. The liquid may be a colloidal solution, suspension or emulsion. In some embodiments the flowable material layer is a polymer-dispersed liquid crystal layer as described in References [11] and [12]. In other embodiments, the flowable material may be a material which deforms plastically in response to the arrival of the generated drop, e.g. a gel or a paste.

When the flowable material is a polymer solution, the polymer solution may comprise a polymer selected from the group including: PVA; polyurethane; polyamides, e.g. Nylon 6,6; PMMA; polyimides, poly(pyromellitic dianhydride oxydianilines) and polystyrene. The solvent may be any suitable solvent, for example: water, dichloromethane, formic acid, acetone, iso-propyl alcohol, toluene, cyclohexane or other organic solvents or derivatives, for example.

Optionally the polymer solution has a concentration from 1 wt % to 30 wt %. More preferably the polymer solution has a concentration from 5 wt % to 20 wt %.

In some embodiments the flowable material comprises a lasing material, for example the flowable material may be an emulsion based lasing medium as described in References [11] and [12]. When the LC material deposit comprises a lasing material, the flowable material may exhibit the same lasing action as the LC material deposit. Alternatively the flowable material may exhibit lasing action of a different type to the LC material deposit.

Preferably the flowable material contains an alignment component to promote alignment in the LC material. The alignment component may include polyimides, surfactants, polymers (e.g. polyvinyl alcohol, polyurethane, polyamides, Nylon 6,6, polymethyl methacrylate or poly(pyromellitic, polydiandydride oxydianiline)) or derivatives of these materials which promote a preferred orientation of the LC.

The flowable material containing an alignment component provides the advantage of providing chemical control of alignment within the LC material in addition to the physical control by shaping the LC material deposit. Therefore the use of an alignment component further improves alignment within the LC material.

Preferably the flowable material contains an alignment component to promote planar degenerate alignment in the LC material. When the LC material is a chiral LC material, suitably the planar degenerate alignment component causes homeotropic alignment (perpendicular anchoring) of the LC optical axes within the LC material deposit.

The use of a planar degenerate alignment component also further improves alignment within the LC material. For example, a chiral LC material contains molecules which self-organise along a helicoidal axis, as discussed above. The shaping of the LC material deposit described above improves the alignment of the helicoidal axes. Providing a planar degenerate alignment component in the flowable material layer causes molecules at the base of the LC material deposit to align parallel to the surface of the flowable material layer. This alignment of molecules at the base of the helicoidal structures causes the helicoidal axes to align perpendicular to the flowable material layer surface (or underlayer surface). This is particularly advantageous for band-edge lasing.

Suitably, the flowable material layer is formed on a substrate. Another advantage of the present invention is that the choice of substrate is not particularly limited. The substrate may be any material onto whose surface the flowable material may be deposited and which provides a suitable support for the photonic device. The substrate may be light-transmissive or reflective, e.g. to allow illumination of the LC material drop with pumping radiation for operation as a laser. Therefore suitable substrates include light-transmissive glass and light-transmissive plastics. The substrate may, for example, be rigid or substantially rigid. Alternatively, the substrate may be flexible.

The surface of the substrate may be patterned with structures, such as wells or barriers. The patterned substrate allows further control of the spatial location, or shape of the flowable layer, deposited LC material and/or protective layers.

Preferably the flowable material layer is deposited by film coating using a doctor blade, bar coating, roll-coating or inkjet deposition of a continuous film, individual drops, or groups of connected drops. Inkjet deposition of the flowable material allows continuous "printing" of LC photonic devices.

Alternatively, the flowable material may be deposited in discrete regions, for example, in the form of either individual deposits or groups of connected deposits to form lines or other features. The provision of discrete regions of flowable material layer allows asymmetric stress to be induced in the later deposited LC materials to produce desired optical features.

When inkjet printing is used to deposit the flowable material, the digital nature of the inkjet deposition method also allows flexibility of altering the order and location of material deposition, e.g. LC materials onto flowable material or vice versa, or creating multi-layer structures consisting of one or more layers of LC materials and other flowable materials. The application of the method of the present invention described can also extend to a wider range of LC materials, including but not limited to nematic, chiral nematic, smectic, blue phase or any combination of these materials.

Suitably, the method comprises a step of providing a protective layer. Preferably, the protective material layer is deposited on top of the LC material deposit. The protective material may be the same material as the flowable material. The protective material layer may be transformed into a protective support layer. Preferably the protective material layer and the flowable material layer (or support layer, or underlayer) together totally encapsulate the LC material deposit. The protective material layer may also further shape the LC material deposit to induce further alignment within the LC material.

The protective material layer may provide a hydrophobic or hydrophilic surface. The protective material layer may be an oxygen scavenger or getter. The protective material layer may be a moisture barrier or a preferential absorber. For example, polyurethane, PVA, polydimethylsiloxane or other silicones may be used. The optional and preferred features described above for the flowable material layer also apply to the protective material layer. For example, preferably the protective layer contains an alignment component to improve alignment in the LC material deposit. Suitably protective materials may comprise: PVA, polyurethane, Nylon 6,6, polymethyl methacrylate, polyimides, poly(pyromellitic dianhydride oxydianiline), metal-oxide polymer composites or derivatives of these materials.

As mentioned above, preferably the flowable material layer has a thickness $T1$ greater than diameter $D1$ that would be attributed to the volume V of the LC material aliquot. This allows the flowable material layer to shape the deposit of LC material.

Preferably the flowable material has a thickness $T1$ less than 10 times the diameter $D1$ of the generated drop of LC material. Suitably the thickness $T1$ is between 10 mm and 10 nm, more suitably between 1 mm and 1 µm, and more suitably still between 100 µm and 10 µm. If $T1$ is too large the drop of LC material deposited on the flowable material layer may be moved from the location of deposition by currents caused within the flowable material. For example, when the flowable material is a solution, the length of time the flowable material exists in a liquid phase is typically increased as the thickness of the flowable material layer is increased. As the solvent evaporates from the solution layer this may cause a current to flow in the flowable material which may disturb the position of a drop of LC material on the flowable material layer. Therefore control of the thickness of the flowable material layer is advantageous. Control of the curing rate of the flowable material layer is also advantageous for the same reasons.

Preferably the ratio of the thickness $T2$ of the support layer to the thickness of the flowable layer is in the range 1:1 to 0.01:1.

Preferably the flowable material layer has a substantially constant thickness across the layer. Inkjet printing of the flowable material layer allows precise control of the thickness of this layer.

Suitably the protective layer has a thickness in the range of 10 nm to 10 mm.

Preferably the method comprises providing a second, and optionally a third, and optionally a fourth etc., aliquot of a LC material and depositing it on a flowable material layer, i.e. steps (i) and (ii) are repeated. In this way, there can be provided a device having a plurality of photonic locations such as active photonic locations. Suitably the second and optionally further deposits of LC material are deposited on the same flowable material layer as the first drop but each in a different location from the first drop. In this way the method may be used to obtain an array (preferably an ordered array) of LC material deposits on the flowable material layer. Alternatively the second, and optionally third, and optionally fourth etc., deposits may each be deposited on a different flowable material layer, i.e. a second, and optionally third, and optionally fourth etc., flowable material layer. In this way the method may be used to obtain LC material deposits on several separate flowable material layers. In this case, the flowable material layers may be different, e.g. in terms of composition, thickness etc. in order to provide different control to the drops of LC material.

In some embodiments the method comprises generating a second, and optionally a third, and optionally and fourth etc., aliquot of a LC material and depositing the LC material on a flowable material layer in the same location as the first LC material deposit. This allows the size of the LC material deposits to be controlled.

In some embodiments, when a plurality of aliquots of LC material are provided, the LC material deposited in different locations may be the same LC material. Alternatively the LC material deposited in different locations may be different LC materials, for example when different lasing action is required at different locations.

Preferably the ratio of the volume V (measured in µm³) of the aliquot of LC material to the length L1 (measured in µm) of the LC material deposit is in the range 10:1 to 1,000,000:1 µm².

In some embodiments, it is preferred that the flowable material layer comprises two or more distinct layers. This can be advantageous in order to provide an upper layer that provides a specific desired interaction with the incoming LC aliquot and a lower layer (or lower layers) that provides either a desired interaction with the incoming LC aliquot or another a desired interaction with the upper layer.

In a sixth preferred aspect, the present invention provides a use of a photonic device according to the third or fifth aspect, in which the photonic device is subjected to illumination by a source of electromagnetic radiation and provides a corresponding response which is detected by a detector or by observation.

In relation to the sixth aspect of the invention, there are several modes of operation of the photonic device which are contemplated. These depend on the device itself and on the illumination of the device.

Where the photonic device is a laser, the device typically incorporates a laser dye. The illumination by a source of electromagnetic radiation preferably provides optical pumping. In this case the source is itself typically a laser. However, the source may alternatively be an LED such as a high power LED.

It is possible to operate the laser above threshold. That is, the optical pumping provided by the source is sufficient to provide lasing in the LC material deposit.

However, it is alternatively possible to operate the laser below threshold, by suitable adjustment of the power of the source, the output spectrum of the source, or by using a different source. In this case, the laser dye may still fluoresce, but the number of photons emitted by the laser dye is insufficient to cause true lasing. However, the optical output of the device may include characteristics related to the interaction of the photons emitted by the laser dye and the photonic band gap of the LC material deposit. In this case, therefore, below-threshold operation of the photonic device may be suitable to provide a characteristic output that can be detected or observed. In this manner, below-threshold operation of the photonic device may provide a security feature that can be interrogated using a suitable illumination source. Furthermore, other fluorescent chromophores may be used in place of a conventional laser dye. These may include other fluorescent taggants, dyes or quantum dots, for example, where the native fluorescence is modified by the presence of the liquid crystal photonic bandgap.

It is of particular interest to note that the same photonic device can be subjected to either of the modes of operation mentioned above. Thus, where a suitable source of electromagnetic radiation is available, the photonic device can be operated above threshold, with the resultant and the laser output from the device. However, where only a lower power source of electromagnetic radiation is available, the photonic device can be operated below threshold, with the resultant below-threshold characteristic output.

The photonic device need not incorporate a laser or fluorescent dye. The photonic device may be used in passive mode. In this case illumination of the device by ambient light or by light from a particular source (e.g. an LED of known spectral output) can cause selective reflection from the photonic device based on the photonic bandgap. Non-fluorescent dyes, or material which absorbs certain portions of the electromagnetic spectrum, may also be added to the mixture to create a characteristic signature.

In each of these modes of operation, it is preferred that multiple photonic devices are provided, arranged in a suitable array or pattern. The array or pattern may be ordered, e.g. it may have some degree of symmetry or provide a recognisable shape. However, it is not essential that the array or pattern is ordered. A truly random or an apparently random array or pattern can be used. The positional location of the devices on the substrate and relative to each other can be used to encode information. Such arrays or patterns are straightforward to achieve based on the inkjet printing approach described. The optical response may vary from device to device in the array. The resultant arrayed optical response of the photonic devices, when suitably illuminated, provides a powerful basis for a security feature for identifying objects or documents of value.

Further optional features of the invention are set out below.

BRIEF DESCRIPTION OF THE DRAWINGS

Embodiments of the invention will now be described by way of example with reference to the accompanying drawings in which.

Figure 1:
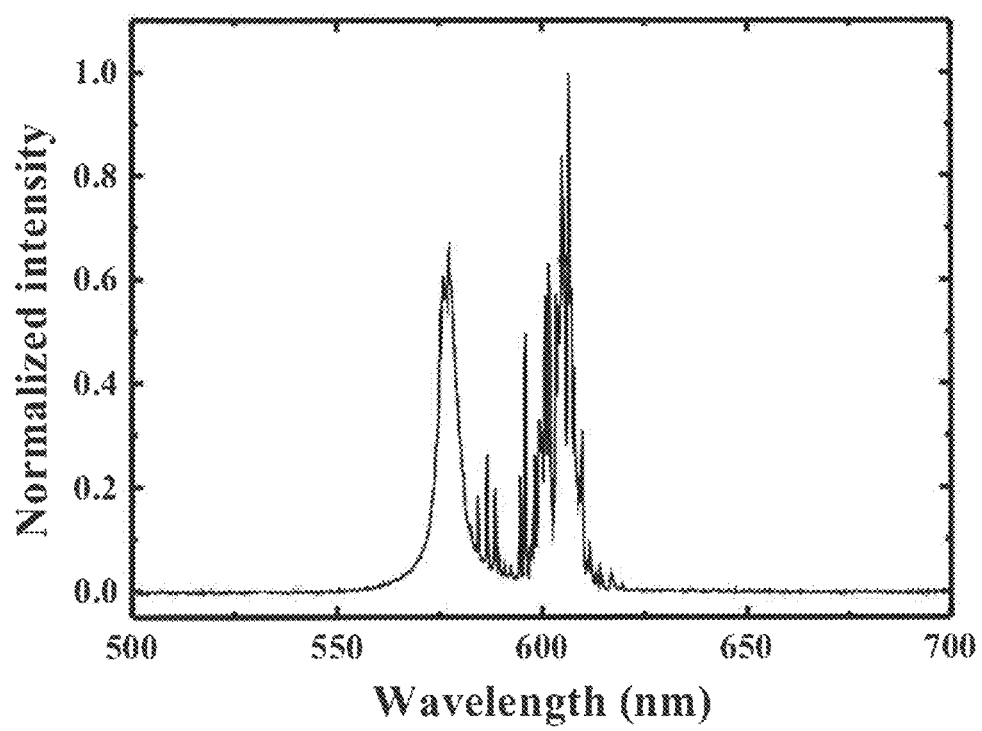
FIG. 1 shows the emission spectrum under optical excitation at a wavelength of 532 nm for a deposit of comparative example 1.

DETAILED DESCRIPTION OF THE PREFERRED EMBODIMENTS, AND FURTHER OPTIONAL FEATURES OF THE INVENTION

Chiral nematic liquid crystals (LCs) are a unique class of functional photonic materials with applications ranging from bistable displays to lasers.[1] [2] In these materials, the constituent elongated molecules self-organize into a helicoidal arrangement around the helical, or optical, axis. The resultant periodic variation of the refractive index gives rise to a photonic band-gap for visible wavelengths.[3] This has recently received significant interest in the context of photonic band-edge lasing,[2, 4] since incorporation of an organic fluorescent dye, as the gain medium, into the helical structure, or optical cavity, can lead to laser emission at the photonic band-edges. Such systems offer high slope efficiency, greater than 60%, narrow linewidth emission[5] and, with the self-organized "soft" periodic structure, broadband wavelength selectivity and tuneability. Typical laser emission wavelengths are in the range 450 nm to 850 nm[6-10]. The present invention exploits the liquid-like properties of the chiral LC laser and describes an inkjet deposition approach for these materials. Such an approach allows simple and arbitrary positional control of laser sources, incompatible with conventional laser processing and fabrication, to realize new classes of functional photonic materials and devices.

Lasing LC media offers significant potential for not only reducing manufacturing cost, but also to form coatings on surfaces, or devices, currently inaccessible to the traditional processing required in the fabrication of semiconductor lasers. Precise and controllable positioning of the location and size of individual laser deposits would significantly improve the functionality of the laser coatings and devices. Ordered laser array structures, for example, would be of particular interest in bio-assay arrays, optofluidic applications and new information displays.

In recent years, there has been increased interest in using direct writing processes such as inkjet printing as flexible fabrication methods for electronics and biological devices.[14] The present invention uses a "drop-on-demand"[15] inkjet deposition process that controls precisely the aliquot size and allows the formation of spatially localized arrays of LC material deposits, for example spatially localized laser sources. By depositing the LC lasing material onto a flowable material, e.g. a wet, solution-based polymer, the necessary alignment within the LC material can be obtained.

When the LC material contains a laser dye, following optical excitation at the absorption maximum of the laser dye, single-mode laser emission is observed with a well defined threshold and narrow linewidth when the necessary alignment within the LC material is obtained. The present invention shows that the inkjet deposition process has only a minor effect on the lasing threshold and emission characteristics of the LC laser system relative to control cells fabricated using conventional glass cell assembly methods. The results demonstrate the possibility of creating truly two-dimensional laser arrays of controlled and arbitrary size, position, and wavelength for use in a diverse range of applications.

Although a central aim of the development of the present invention has been to manufacture laser devices, it is not essential that the final device is a laser device. Other photonic devices are contemplated. Other optical effects can be generated, enabled by the alignment of chiral nematic liquid crystals.

The inherent chiral nematic liquid crystal optical photonic bandgap, also known as the selective wavelength reflection band, can also be used by itself to create optical effects and photonic devices, e.g. without the need to add a laser dye, or even with the addition of a laser dye but without above-threshold operation of the laser dye.

One of the key properties of aligned chiral nematic liquid crystals is this well-defined one-dimensional photonic band-gap for light propagation parallel to the helical axis. In order to observe the photonic band-gap effect, the intrinsic pitch of the chiral nematic liquid crystal (i.e. the distance for 360° rotation of the local nematic director or preferred orientation) should be of the same order as the wavelength range of interest. This optical property of chiral nematic liquid crystals is well known in the literature (see, for example, H. J. Coles, "Handbook of Liquid Crystals" Vol. 2A (Chapter 4) "Chiral nematics: Physical properties and applications" pages 335-411, Editors D. Demus, J. Goodby, G. W. Gray, H.-W. Spiess, V. Vill, Wiley (1998)).

Figure 8:
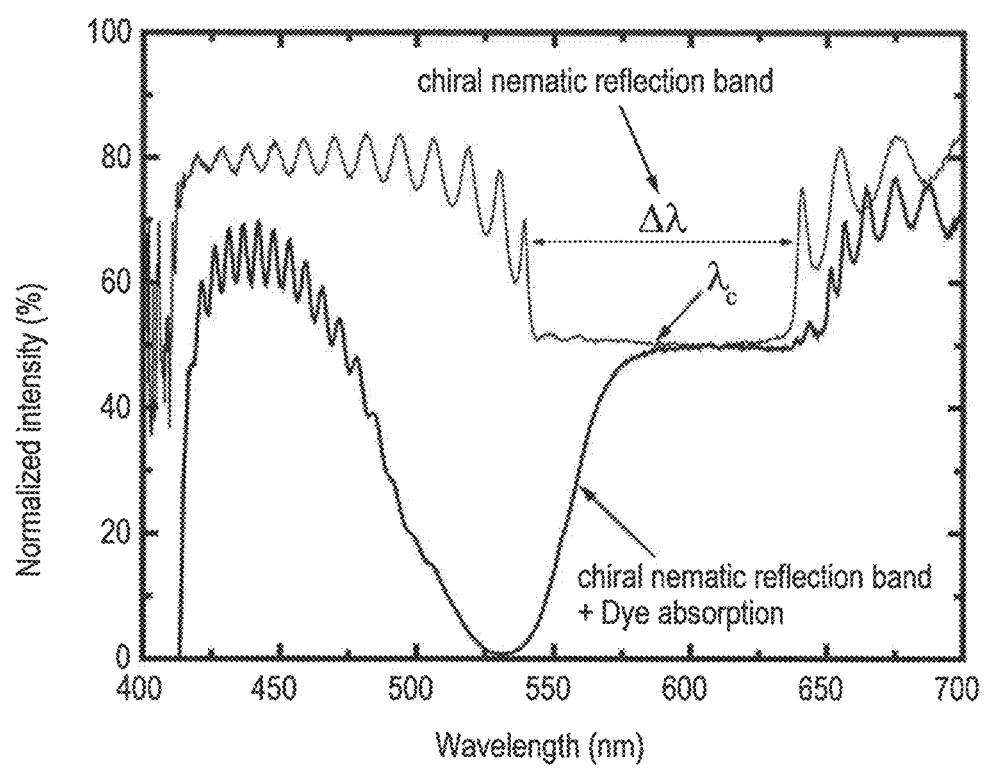
FIG. 8 is a graph showing an example reflection band for a chiral nematic LC material and for the same chiral nematic LC material combined with a dye.

An example reflection band shown in FIG. 8. In this case, 3.9% w/w of the high-twisting power chiral additive BDH-1281 was added to the liquid crystal host BL006. The mixture was capillary filled into a test cell comprising glass substrates, separated by 9 μm spacer beads and where the surfaces were treated (rubbed polyimide) to obtain helical alignment perpendicular to the substrates. The cell was then mounted on a microscope (Olympus BX-51), illuminated with white light, and the characteristics of the transmitted light measured by spectrometer (Ocean Optics USB2000).

The position of the central wavelength of the photonic band-gap, $\lambda_c$, and width of the reflection band, $\Delta\lambda$, is determined by the intrinsic pitch, P (the length scale at which the LC director rotates by 360°) of the liquid crystal and the birefringence, $\Delta n$, of the nematic liquid crystal host, given by the following relations:

$$\lambda_c = n_{av} P \text{ and } \Delta\lambda = \Delta n P$$

where $n_{av}$ is the average of the refractive indices parallel and perpendicular to the local nematic director. Through choice of the pitch (readily manipulated through concentration of the chiral additive) and/or birefringence, the position and width of the reflection band can be easily adjusted.

The 1-D photonic band-gap only exists for light propagating parallel to the helical axis. Therefore, to observe the photonic band-gap for chiral nematic liquid crystals where the viewing direction is substantially perpendicular to the substrate, the chiral axis should be aligned substantially perpendicular to the substrate also. The preferred embodiments of the invention, described below, promote such alignment through a print deposition process. In some embodiments, it may be useful to have certain values of the pitch and/or birefringence such that certain wavelengths, or ranges of wavelengths, are preferentially reflected. For example, for certain effects it may be advantageous to have different regions reflecting red, green, or blue portions of the spectrum, or regions outside of the visible spectrum. Preferably, the reflection band may be intentionally designed to reflect a known portion of the spectrum created by a device equipped with an LED light source (e.g. mobile phone, camera phone, smart phone) where otherwise the material possesses only low visibility to the unaided eye. In principle, any portion or part of the optical spectrum may be selectively reflected.

It may also be practically useful to add absorbing dyes to the liquid crystal host in order to further modify the absorption characteristics. Also shown in FIG. 8 is a sample in which 1% PM-597 dye was added to the host chiral nematic liquid crystal. The optical characteristics measured are essentially a superposition of the dye absorption and liquid crystal reflection band. Many choices of dye would be obvious to those skilled in the art; in particular for authentication and security applications it may be beneficial to add dyes which absorb outside of the visible spectrum, for example.

The optical effects described are particularly applicable in creating unique optical signatures for anti-counterfeiting, brand authentication and general security printing and packaging, for example.

In addition to the passive optical reflection described above, other practically useful photonic effects may be generated. These include pre-threshold laser emission or fluorescence modified by the presence of the chiral nematic photonic band-gap, for example. Further details are provided in Examples 5 and 6, below.

The liquid crystal (LC) material used in the following examples was prepared by adding 4.2 wt % of the chiral additive BDH1281 (Merck KGaA) to the achiral nematic LC BL006 (Merck KGaA) to generate the chiral nematic phase (BL006 is a commercially available, wide temperature nematic liquid crystal mixture comprising 4-cyano-4'-pentyl-1,1'-biphenyl and terphenyl derivatives). The high quantum efficiency laser dye, Pyrromethene-597 (1,3,5,7,8-pentamethyl-2,6-di-t-butylpyrromethene-difluoroborate complex, obtained from Exciton, and used without further purification), was added to the chiral nematic mixture at a concentration of 1% w/w. Mixtures were placed in an oven for a period of 24 hours at 10° C. above the nematic to isotropic transition temperature to ensure sufficient thermal diffusion of the constituents. In order to confirm the position of the long-wavelength photonic band-edge, which defines the laser wavelength of the LC deposit, mixtures were capillary filled into 10 µm thickness glass cells, which had antiparallel rubbed polyimide alignment layers.

Comparative Example 1

Initial experiments were performed depositing the lasing LC formulations onto cleaned, plain glass substrates. The optimized lasing LC mixture contained the nematic liquid crystal BL006, high twisting power chiral additive (4.2% wt BDH-1281) and fluorescent dye (1% wt pyrromethene-597). The mixture was designed to have an emission wavelength at the gain maximum of the dye, close to 585 nm in LC media. The viscosity of the LC mixture was around 110 mPa·s at 20° C., significantly greater than the jetting limit of 20 mPa·s, suggested by the print head manufacturer (MicroFab). However, extended rheological measurement of the LC mixture has shown that its viscosity decreases significantly at elevated temperature, obeying the typical Arrhenius behaviour. While commercial inkjet systems typically process inks at room or modestly elevated temperature, much higher ink temperature has been shown to be feasible for printing functional materials such as phase-change resists.[16] Therefore, the print head was heated to 90° C. to 95° C., close to the isotropic to nematic transition point of the LC laser mixture, to provide the optimum viscosity for printing. After printing, uniform sessile drops were obtained with a typical diameter of approximately 200 microns.

A deposit obtained after inkjet deposition onto the cleaned, plain glass substrate was examined between crossed polarizers. It was clear that disclination lines, representing defects in the director orientation, were widespread across the droplet. Non-uniformity was also visible within the deposit, in this case a substantially circular drop, indicated by a change in colour from the center of the drop to the edges. The colour of the drop, when viewed under cross polarizers was red at the centre with the colour changing to blue towards the edge of the drop as the drop thickness reduces.

To examine the emission characteristics, samples were optically excited by the second harmonic of an Nd:YAG laser (532 nm, 3-4 ns pulse duration), focused to a spot size of 110 microns. The resultant emission profile, shown in FIG. 1, demonstrates a strong multi-mode lasing output, characterized by a series of variable linewidth peaks between approximately 560 nm and 620 nm (corresponding to the fluorescence emission curve of PM-597). The large number of lasing modes is indicative of multiple domains within the droplet, consisting of regions with different values of the helical pitch.

Previous work, in rubbed planar surface aligned LC cells, described by Morris et. al, [2005][13] showed that multi-domain samples with slightly different pitch values, and with a typical domain size equal to or less than the pump spot size, resulted in multi-mode lasing output. On the other hand, monodomain samples exhibited high quality, single mode lasing. Poor emission characteristics, such as those presented in FIG. 1, significantly limit the scope of laser applications, which typically demand narrow linewidths centered on a well-defined emission wavelength.

Example 1

10 wt. % polyvinyl alcohol PVA (average molecular weight 10,000 amu, 85% hydrolysed) solutions were drop-casted onto clean glass slides to form wet PVA films. 50 µm-thick polyimide (Kapton) tapes were laid down on the glass slide first as depth gauges before the PVA solution was deposited using a second glass slide as a squeegee. A custom printing rig, consisting of a single-nozzle Microfab printing device (80 µm nozzle diameter) was used to pattern the LC deposits onto the wet PVA film. To reduce the viscosity of the LC mixture from 110 mPa·s at room temperature to the jettable limit of 20 mPa·s of the MicroFab device, the print head was heated and maintained at between 90° C. and 95° C., just below the isotropic to nematic transition temperature. A custom pneumatic/vacuum controller was used to maintain the LC meniscus position at the nozzle and a bipolar waveform was applied to eject LC material onto the wet PVA film.

Figure 2:
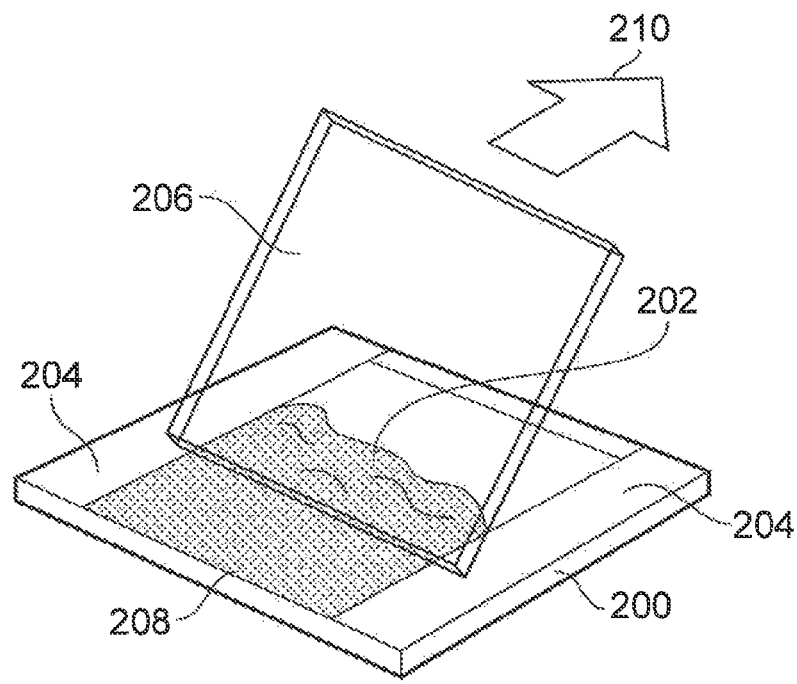
FIG. 2 is a schematic view showing the creation of the flowable material layer according to an embodiment of the present invention.

In an attempt to combine the desirable features of inducing alignment within the LC material, for example the alignment necessary to obtain single-mode laser emission characteristics, with accurate spatial positioning of the LC material, the present inventors have developed the alternative deposition approach described above in which the LC material is directly printed mixture onto a flowable material layer, for example a wet film of 10 wt % PVA polymer solution in deionized water, as illustrated in FIGS. 2 and 3.

FIG. 2 shows a schematic diagram illustrating the deposition of the flowable material 202, in this case the PVA polymer solution described above, on a substrate 200, in this case a glass slide. The substrate is provided with a depth gauge 204, in this example Kapton tape is provided as the depth gauge along opposite sides of the glass slide 200. The flowable material 202, e.g. the PVA polymer solution described above, is deposited on the substrate by any suitable method, for example by drop-casting as described above. A bar or blade 206, for example a glass slide, is then drawn across the substrate in the direction shown by arrow 210 to leave behind a flowable material layer 208 with constant thickness. The thickness of the flowable material layer (the wet film) is defined by the depth gauge 204 and in this case was approximately 50 μm across the flowable material layer. This method of depositing the flowable material layer is a method known as doctor blading.

Figure 3A:
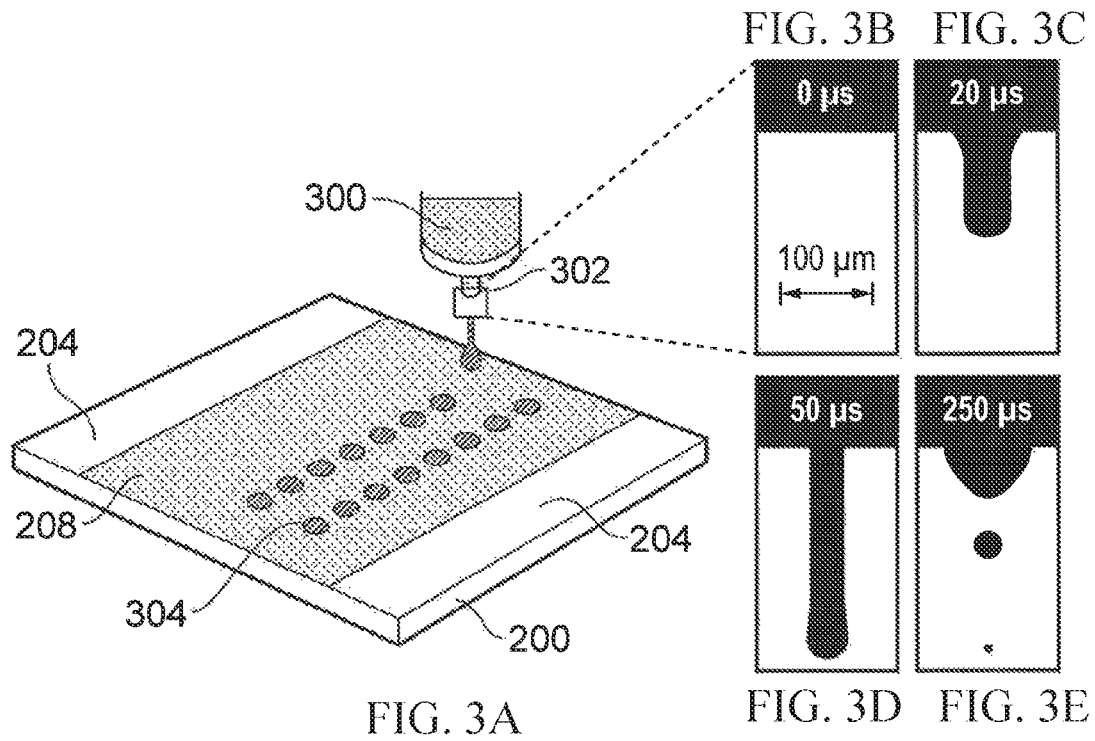
FIG. 3A is a schematic view showing inkjet printing of a LC material according to an embodiment of the present invention.
Figures 3B, 3C:
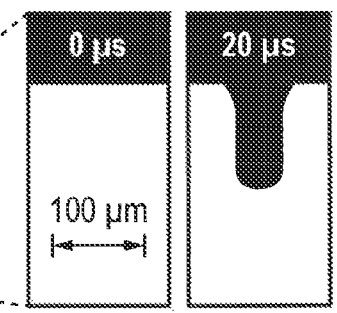
FIG. 3B is an enlarged view captured during microscopic imaging of the print head shown in FIG. 3A at 0 µs during generation of a deposit of LC material.
FIG. 3C is an enlarged view captured during microscopic imaging of the print head shown in FIG. 3A at 20 µs during generation of a deposit of LC material.
Figures 3D, 3E:
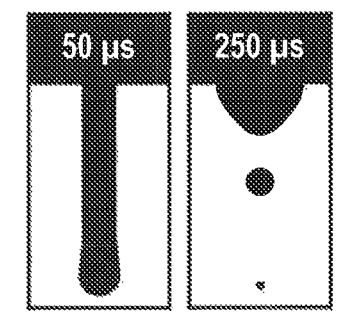
FIG. 3D is an enlarged view captured during microscopic imaging of the print head shown in FIG. 3A at 50 µs during generation of a deposit of LC material.
FIG. 3E is an enlarged view captured during microscopic imaging of the print head shown in FIG. 3A at 250 µs during generation of a deposit of LC material.

FIG. 3A shows a schematic diagram illustrating inkjet printing of a LC material on a flowable material layer deposited as described in FIG. 2. The features that were described for FIG. 2 are not described again but are given similar reference numbers. FIG. 3A shows a print-head 300 which generates aliquots, in this example drops, of a LC material and deposits LC material on a flowable material layer 208. The print head is controlled by any suitable control means, for example piezoelectric control means, to accurately position a LC material deposit on the flowable layer. In this example, the print head inkjet prints an ordered array of LC material deposits. FIGS. 3B to 3E show an enlarged cross-section through the print head tip 302 of print head 300 as a deposit of LC material is generated and deposited as LC material deposit 304 on the flowable material layer. FIG. 3B shows the print head tip before generation of a drop of LC material (at 0 μs). FIG. 3C shows the print head tip at 20 μs after generation of the drop of LC material begins. FIG. 3D shows the print head tip at 50 μs after generation of the drop of LC material begins. FIG. 3E shows formation of the drop of LC material 250 μs after generation of the drop of LC material begins; this drop is then deposited onto the flowable material layer 208.

Figure 4A:
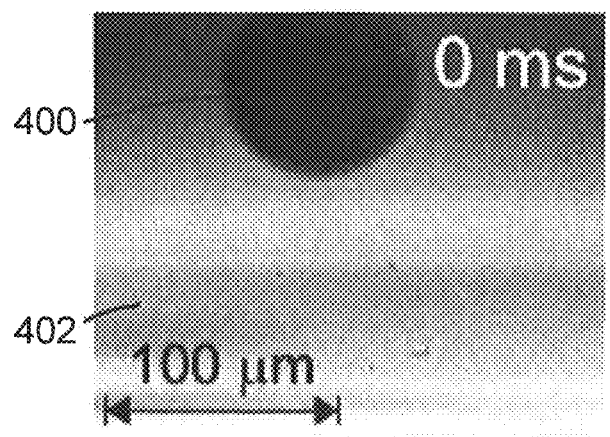
FIG. 4A is a scaled high-speed microscopic image showing the deposit of LC material generated by an inkjet printing head at a reference time of 0 ms.
Figure 4B:
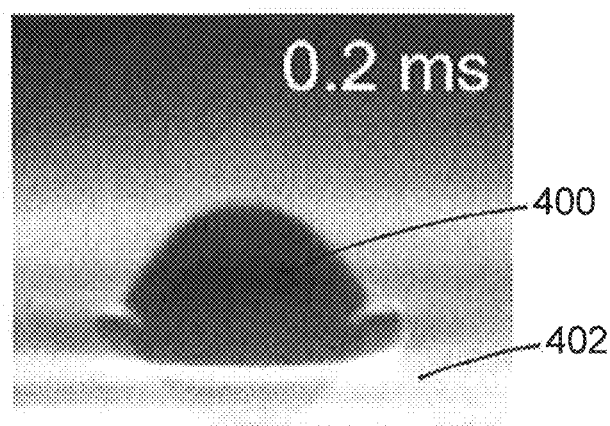
FIG. 4B is a scaled high-speed microscopic image showing the deposit of LC material impacting the surface of the flowable material layer 0.2 ms after the reference time.
Figure 4C:
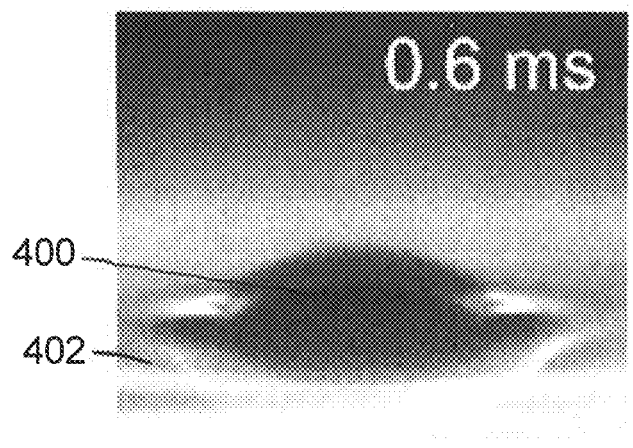
FIG. 4C is a scaled high-speed microscopic image showing the deposit of LC material on the flowable material layer 0.6 ms after the reference time.
Figure 4:
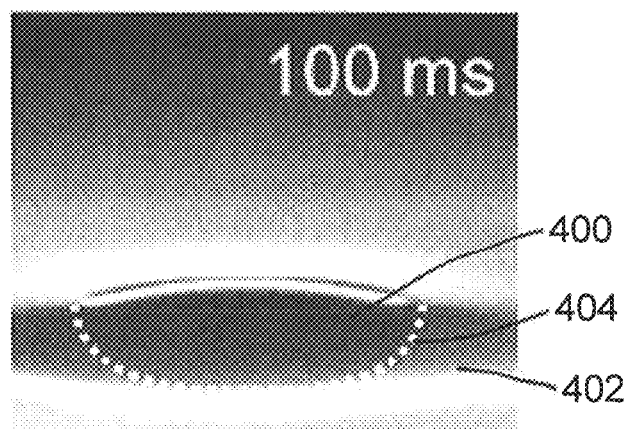
FIG. 4D is a scaled high-speed microscopic image showing the deposit of LC material on the flowable material layer 100 ms after the reference time.
FIG. 4E is a scaled high-speed microscopic image showing the deposit of LC material on the flowable material layer 500 ms after the reference time.
FIG. 4F is a scaled high-speed microscopic image showing the deposit of LC material on the flowable material layer 2 s after the reference time.
Figure 4:
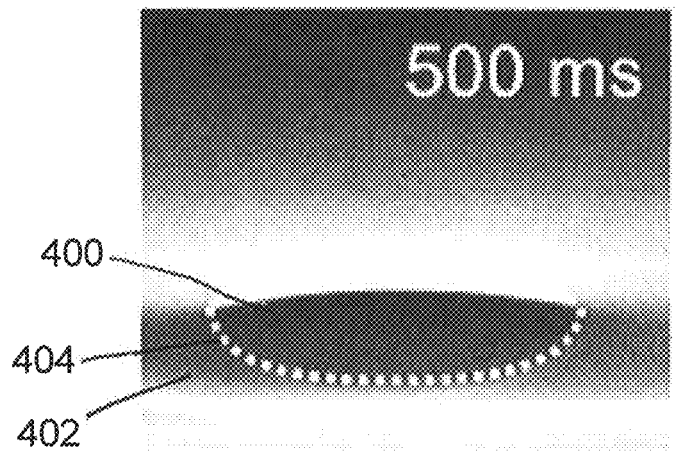
Figure 4:
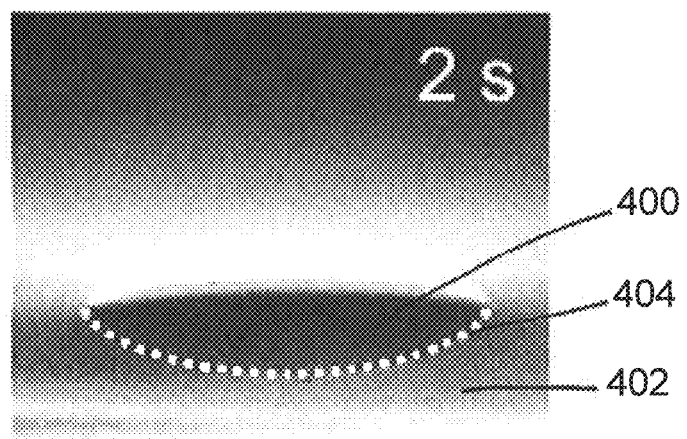

The key stages of a typical droplet deposition event are shown in FIGS. 4A to 4F, which show images captured from a high-speed camera. FIG. 4A shows an approximately spherical drop of LC material 400 approaching the flowable material layer 402 after generation of the drop by inkjet printing. FIG. 4B shows the LC droplet impacting the surface of the flowable material layer 402 at 0.2 ms after the image shown in FIG. 4A. As the LC material drop impacts the surface the subsequent deformation of the surface of the flowable material layer and the droplet is evident. However, in FIGS. 4C to 4E, frames at 0.6 ms, 100 ms and 500 ms respectively after the image shown in FIG. 4A, it is clear that the surface tension and immiscibility of the wet PVA solution to the LC droplet is sufficient to prevent the droplet entering the bulk polymer solution. Finally, in FIG. 4F, the 2 s frame, the droplet is shown in the equilibrium position on the surface of the film with a well-defined and symmetrical profile.

The necessary alignment of the LC, in the standing helix configuration, for lasing appears to be achieved through a combination of interaction of the PVA polymer with the LC and mechanical forces occurring through deformation of the LC droplet. The interaction of PVA polymer with both nematic and chiral LCs has been examined previously in the context of polymer dispersed liquid crystal devices (PDLCs) .[17] It was determined that PVA promotes parallel arrangement of the LC director at the interface,[18, 19] Following the impact process depicted in FIGS. 4B to 4E, and the resultant lateral shear as it reaches an equilibrium state, shown in FIG. 4F, the LC droplet adopts an oblate shape with the minor-axis perpendicular to the PVA film. The boundary between the LC material and the flowable material on the surface of the drop of LC material encapsulated by the flowable material is shown by the dotted line 404. The ratio of the length L1 of the LC material deposit (in this example the deposit was a substantially circular drop, therefore the length L1 is the diameter of the deposited drop) on the flowable material layer in FIG. 4F to the diameter D1 of the sphere with the same volume V as the aliquot of LC material generated (in this example the aliquot of LC material was a substantially spherical drop of diameter D1) in FIG. 4A is approximately 2:1 (D1 was measured to be 80 μm, L1 was measured to be 160 μm and H1 was measured to be 51 μm). When the flowable material layer and LC material deposit were dried the ratio of the length L2 to D1 was approximately 3:1 (L2 was measured to be 250 μm and H2 was estimated to be 10 μm). It is noteworthy that the droplet does not continue to wet the surface and both the droplet shape and profile remain fixed after the film has dried. The combination of the parallel anchoring and lateral motion leads to the standing helix alignment depicted in FIG. 5 and confirmed through polarizing microscopy.

Figure 5A:
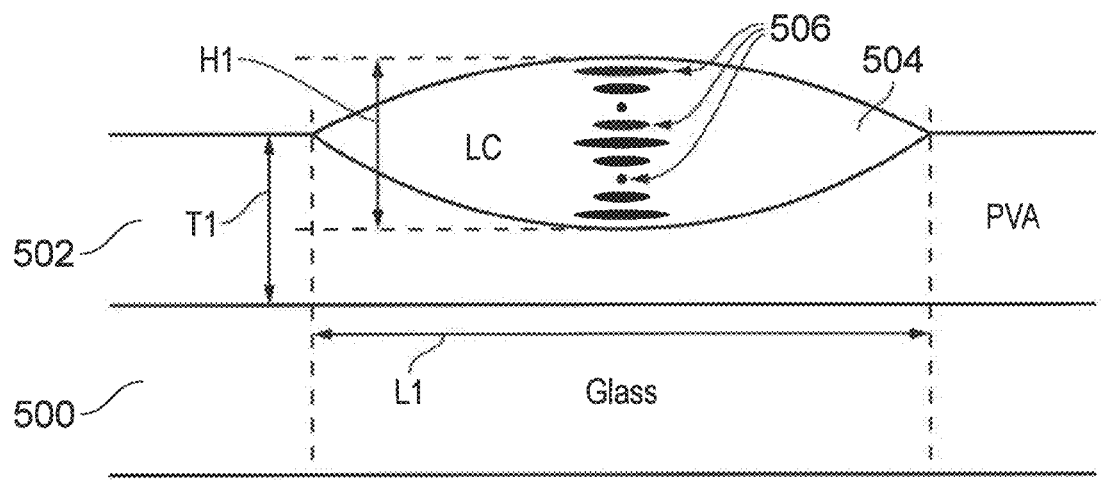
FIG. 5A is a schematic cross-section showing the deposit of LC material on the flowable material layer.

FIG. 5A shows a schematic cross sectional view of substrate 500 which supports a flowable material layer 502 with thickness T1 on which a substantially circular deposit of LC material 504 is formed. FIG. 5 shows the oblate shape of the deposit of LC material formed according to the method of the present invention. The deposit of LC material has a height H1 and a maximum length L1 (diameter in this case). In this example, the LC material is a chiral LC material which contains elongate molecules 506. The immiscibility and the interfacial tension between the LC material and the flowable material induce helicoidal alignment in the elongate molecules.

Figure 5B:
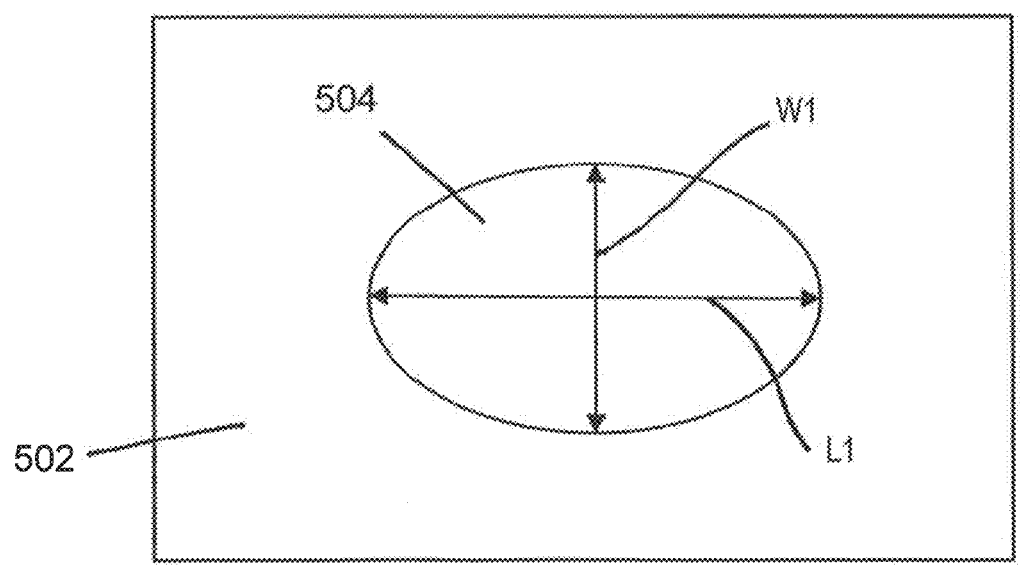
FIG. 5B is a schematic plan view showing the deposit of LC material on the flowable material layer.

FIG. 5B shows a schematic plan view of a flowable material layer 502 on which a LC material deposit 504 is formed. The LC material deposit shown in FIG. 5B has an elliptical shape with a maximum length L1 and a minimum width W1.

The array of LC material deposits of the present invention, produced as described above for Example 1, were examined between crossed polarizers. Compared to the deposited drop onto the untreated surface described above in Comparative Example 1, the LC material deposits produced according to the present invention possess greater uniformity than the LC material deposit on a clean glass substrate as described in Comparative Example 1. All of the LC material deposits deposited according to the present invention were red in colour across the whole deposit when viewed between crossed polarizers. This is directly attributable to a more uniform chiral nematic pitch across the deposit compared to the result described for Comparative Example 1. The texture of the deposits produced according to the present invention was found to remain invariant under rotation by 45°, when viewed between crossed polarisers, indicating that the LC profile is rotationally symmetric within the droplet itself. Furthermore, there is no optical extinction within the droplet, i.e. there exist no regions in which the LC director is parallel or perpendicular to the polarizer or analyzer. Combined with the fact that the material is chiral, wherein the locally uniform liquid crystal director processes to form a macroscopic helix, these observations suggest that the likely LC director profile is one in which the helical axis is perpendicular to the substrate (Grandjean texture or Uniformly Standing Helix). Such an orientation is a pre-requisite for single-mode photonic band-edge lasing in chiral LCs normal to the substrate, where the laser emission occurs along the helical axis.[2]

Following the observation of the required chiral LC alignment, the emission characteristics of the LC lasing deposits were examined.

To measure the excitation laser threshold and the polarization of the emission from the pyrromethene-doped LC emulsion samples, coated films were photo-pumped by the second harmonic (wavelength=532 nm) of an neodymium yttrium aluminium garnet (Nd:YAG) laser (Polaris II, New Wave Research), which had a 3-4 ns pulse duration and a repetition rate of 1 Hz. The input energy was modulated by a built-in attenuation system and monitored using a pyro-electric head connected to a calibrated energy meter. In both cases, so as to ensure that the pump beam did not interact with the photonic band gap, the linear polarization was converted to circular polarization of the opposite handedness to the helix of the chiral nematic LC using a quarter-wave plate. The pump beam was then focussed to a spot size of 110 μm at the sample using a bi-convex lens. The output from the LC samples was collected in the forward direction of the substrates (parallel to the axis of the helix) and focussed onto an HR2000 universal serial bus (USB) spectrometer (Ocean Optics, resolution 0.3 nm) using a lens combination consisting of a doublet and meniscus lens. To avoid detection of the pump beam, long pass filters were inserted before the detector to remove the output from the Nd:YAG laser.

Figure 6:
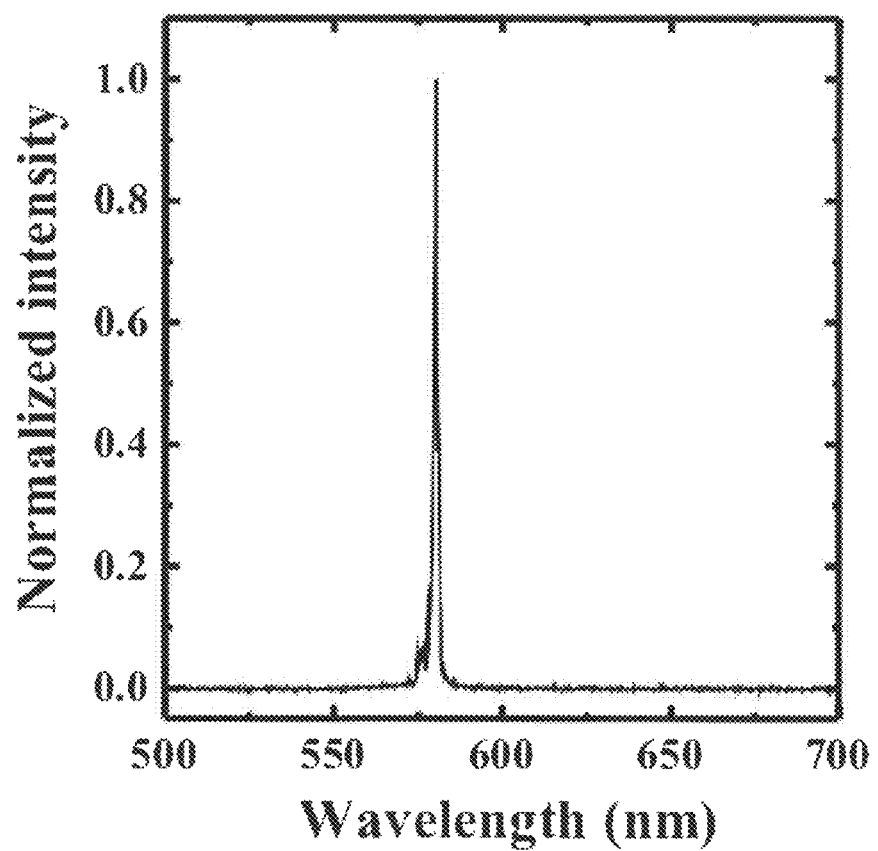
FIG. 6 is a graph showing the laser emission following optical excitation at the absorption maximum of the laser dye from a deposit of LC material deposited according to the present invention.
Figure 7:
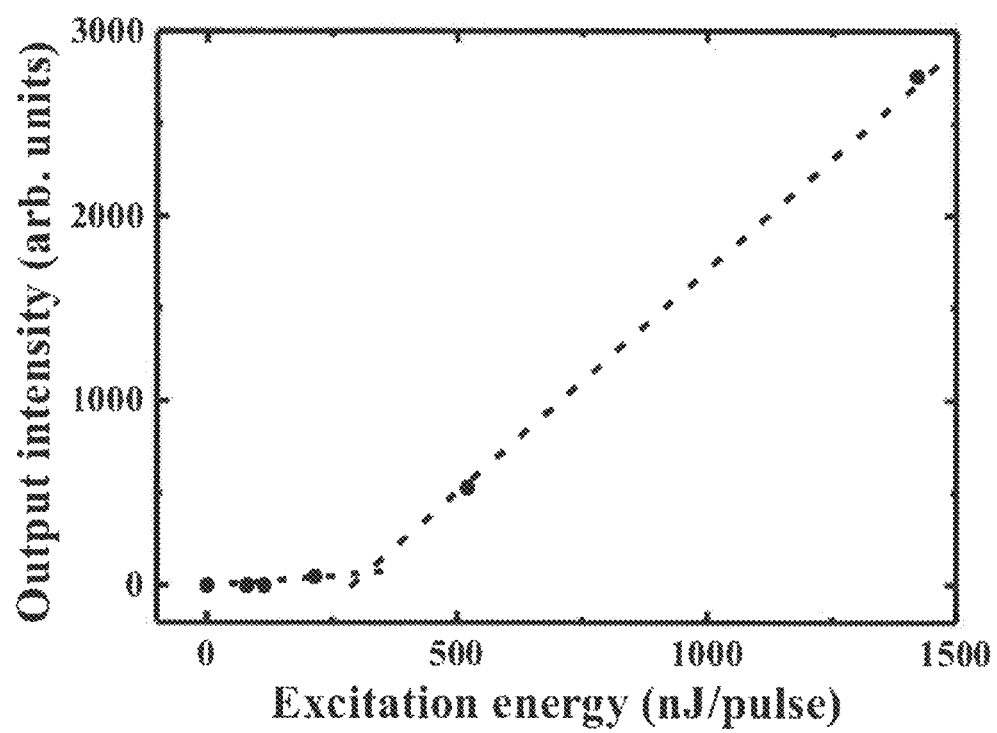
FIG. 7 is a graph showing output intensity as a function of excitation energy for the same LC material as FIG. 6.

After optical excitation at 532 nm, the resulting emission spectrum and input-output characteristics are presented in FIGS. 6 and 7. In FIG. 6, the sample shows clear single-mode behavior with an emission peak of 580 nm, corresponding to the long-wavelength of the photonic band-edge and a linewidth of less than 1 nm. FIG. 7 shows a plot of the input as a function of the output energy, the sample exhibits a lasing threshold of approximately 300 nJ/pulse. For conventional (non-jetted) samples, filled by capillary action into 10 μm transmissive test cells prepared with anti-parallel alignment layers, the threshold was measured to be 100 nJ/pulse. The main reason for the increased threshold is likely to be improper matching of the laser spatial profile with the droplet, meaning there is some incident light that is not being usefully in-coupled into the droplet.

The optimal height H2 for the LC material deposits produced according to the method of the present invention, for lasing near the gain maximum, is around 10 μm as discussed above.[20] The polarization state of the LC laser was experimentally determined and found to be right-circularly polarized, matching the handedness of the helicoidal structure. This provides further evidence that the laser mechanism is due to the large density of states at the edge of the photonic band gap.[21] The single mode nature of the lasing output would appear to be a direct consequence of the significant improvement in droplet uniformity generated by this inkjet deposition technique.

Example 2

The inventors consider that it is practically useful and advantageous to control the viscosity, and other properties, such as surface tension, of materials and inks designed to be used in printing. This is particularly true in inkjet printing where a typical viscosity requirement for successful printing, or jetting, is under approximately 20 mPa·s, with surface tension ideally around 20-70 mN/m. See the discussion at the URL: [http://www.microfab.com/images/pdfs/microjet_mf4] accessed 16 May 2013.

A convenient method to create suitable conditions for inkjet printing is to heat the printhead and/or reservoir, such that the viscosity and surface tension of the material to be printed is within a suitable range. For many materials, including liquid crystals, the viscosity has a strong dependency on temperature; the viscosity typically follows an Arrhenius-type or exponential dependency on the temperature of the material. However, it is useful to be able to jet at temperatures as close to room temperature as possible since this reduces the need for complex heating elements in the printhead and allows off-the-shelf equipment to be used, resulting in lower cost and more widely available production equipment.

For liquid crystal materials, one particularly suitable way to reduce viscosity at a given temperature, or to lower the temperature at which successful printing may take place, is to lower the transition temperature at which the liquid crystal material, or mesophase, undergoes a phase transition to the ordinary, isotropic, liquid. It is well known in this technical field that the phase transition temperature, or clearing point, can be controlled over a wide range (e.g. from well below 0° C. to over 200° C.) by the formulation of the mixture and choice of individual components of the LC material.

In this Example 2, 3% of the chiral dopant R-5011 (Merck) was dissolved into the LC E-100 (Merck, Germany). The clearing point of the mixture was around 68° C. The mixture was inkjet printed using a custom printing rig, consisting of a single-nozzle Microfab printing device (80 μm nozzle diameter) which was used to print the LC deposits. The LC was deposited onto a wet PVA (10% PVA in deionised water; PVA was 10,000 amu average weight and 85% hydrolysed) film. The wet film was deposited using a standard K-bar bar coater (RK Print Ltd. UK), with different film thicknesses of 6, 24 and 100 μm.

The standing helix alignment was confirmed through optical observation. To reduce the viscosity of the LC mixture to the jettable limit of 20 mPa·s of the MicroFab device, the print head was heated and maintained at approximately 77° C., which is above the phase transition point of around 68° C. A custom pneumatic/vacuum controller was used to maintain the LC meniscus position at the nozzle and a bipolar waveform was applied to eject LC material onto the wet PVA film.

This Example therefore demonstrates that it is possible to reduce the printing temperature of the LC material by about 20° C. compared to Example 1, by suitable control of the composition of the LC ink.

Example 3

After deposition of the chiral LC has been deposited, it is practically useful to be able to cross-link the LC material. This improves the environmental and mechanical ruggedness of the device, and/or allows the addition of further functionality to the device.

To allow cross-linking of the LC material, a suitable quantity of reactive mesogen (a material that is a liquid crystal but which contains reactive chemical groups such as acrylate groups as part of the LC molecule itself to allow joining/cross-linking) is included into the chiral LC mixture. In principle the concentration of the reactive mesogen can be from above 0% up to 100% (100% represents the situation where all the LC molecules present have cross-linkable groups).

In Example 3, 3.2% of the chiral dopant R-5011 was dissolved into UCL-011-K1 (Dai-Nippon Ink Corporation, Japan). The material successfully jetted at print head temperature of 115° C. to be deposited on wet PVA films of thickness between 24-50 μm.

The PVA films were formed as described for Example 1. The deposited material was then UV cured (365 nm, Omnicure S1000, 10 mW/cm$^2$) for 10 minutes.

The standing helix alignment was confirmed through optical observation in a similar manner as for Example 1.

Example 4

Experimental work has been carried out to assess the effect of timing between formation of the wet PVA film and subsequent deposition of the LC aliquot by inkjet printing. The amount of time between formation of the wet PVA film and subsequent deposition of the LC aliquot by inkjet printing is referred to here as "processing time".

Based on this work, there appears to be a preferred lower limit of processing time only after which successful (i.e. standing helix) alignment of the LC is found to be generated.

The minimum value of the processing time is found to vary with wet film thickness, composition and processing conditions.

For a 24 μm thick wet PVA (10% PVA in H$_2$O) film, the minimum processing time is just under 250 seconds. The minimum time reduces as the starting thickness of the wet film reduces. It is observed that the minimum processing time can be further controlled (reduced) by active drying of the substrate.

For thick or relatively dilute flowable material layers, it is typically necessary to employ either a relatively long processing time or take active measures (such as active drying) to reduce the processing time.

Without wishing to be bound by theory, the inventors consider that this phenomenon may be due to the need for the flowable material layer to settle and reach a suitable concentration (by drying) in order to provide suitable conditions to promote alignment of the LC material.

The droplet alignment before and after the minimum processing time for a particular film thickness, composition and processing conditions can be directly visualised with polarising optical microscopy as discussed above in relation to Example 1.

Comparative Example 2

To try to improve the deposit uniformity further, experiments were also carried out using deposition onto surfaces treated with rubbed and baked polyimide alignment layers only, which promote planar anchoring of the LC in conventional glass cells. In these experiments, the LC material used was as described above and this material was deposited using similar inkjet processing conditions to those described above. Instead of the flowable material layer of Example 1, the LC material was deposited onto a substrate comprising a planar alignment agent (Merck AM 4276) with uniaxial rubbing direction. In this case, significant wetting of the surface by the droplet was observed both immediately after deposition and as a function of time, making the devices impractical.

Example 5

A chiral nematic, dye-doped liquid crystal mixture was made, consisting of 4.15% w/w BDH-1281 dissolved in the nematic liquid crystal BL006 (both obtained from Merck GmbH, Germany), to which 1% w/w of PM-597 laser dye (Exciton, USA) was added. The mixture was capillary filled into a test cell, with two plane-parallel glass surfaces each coated with rubbed polyimide alignment layers, separated by 9 micron spacer beads, to promote standing helix, or Grandjean, alignment of the chiral nematic liquid crystal. The alignment was confirmed through polarising optical microscopy observation. The sample was then optically pumped by a 532 nm Nd:YAG laser (CryLas, GmbH; focussed by a lens to a spot size around 100 microns) with a pulse energy of approximately 270 nJ. The optical emission was then recorded using an Ocean Optics USB2000 fibre-coupled spectrometer. By way of comparison, a 1% w/w PM-597 in achiral BL006 sample (i.e. no chiral additive) without a photonic band-gap, was optically pumped under the same conditions to illustrate the fluorescence observed without the modifying effect of the optical band-gap. The results are shown in FIG. 9.

Figure 9:
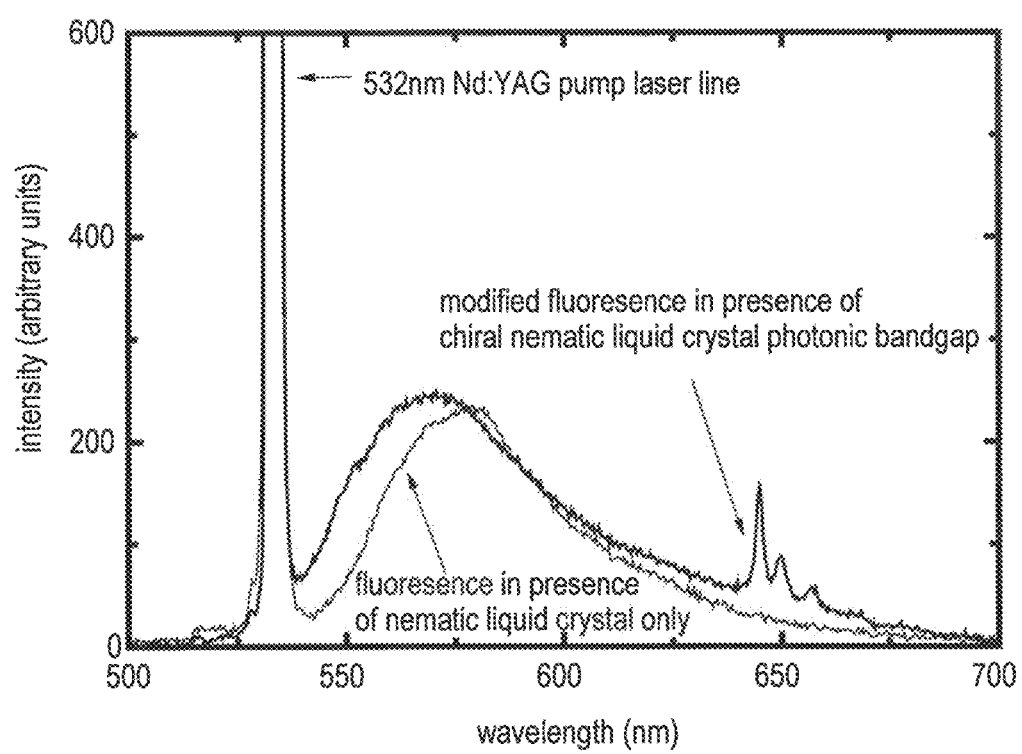
FIG. 9 shows the spectral response for the sample of Example 5.

As seen in FIG. 9, the presence of the photonic band-gap modifies the fluorescence relative to the achiral (no photonic band-gap) sample. This includes, for example, the creation of local maxima in intensity superimposed on the fluorescence. Note that the device here operates in pre-threshold mode, and so can be operated at low intensity of optical pumping. This means that the pump source can be, for example, an LED such as a flash LED typically provided on a camera phone. Such operation is the subject of Example 6, below.

The LC material used in this example is suitable for inkjet printing onto a flowable material layer, for the formation of discrete LC material deposits as described in other examples above.

Example 6

A mixture containing 3.5% w/w BDH-1305 (chiral dopant, obtained from Merck GmbH), 1% DCM laser dye (Exciton, USA) in the nematic liquid crystal host E49 (Merck, GmbH) was filled into a test cell (10 μm path length, rubbed polyimide alignment layers). The sample was then pumped by continuous working LED (450 nm emission wavelength; 1 W optical power; obtained from Luxeon) and the optical emission characteristics measured.

Figure 10:
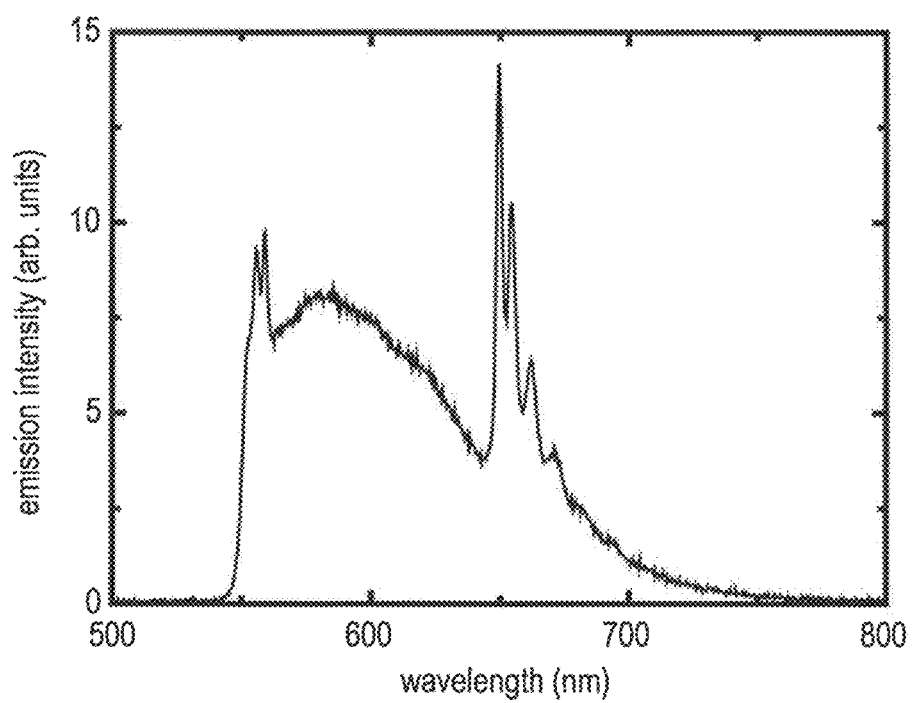
FIG. 10 shows the spectral response for the sample of Example 6.

The emission intensity as a function of wavelength is shown in FIG. 10 where a characteristic profile is shown. The characteristic emission profile, in terms of the spectral location and intensity, can be controlled readily by altering one or more of, for example: the position and width of the photonic band-gap; the fluorescence spectrum of the dye; the pump wavelength; and the power of the excitation source.

The same optical effects are also observable in samples where print deposition is used—once the step of standing helix alignment, perpendicular to the substrate, is generated.

CONCLUSION

It is expected that complex and functional laser/photonic device arrays, created by the inkjet technique of the present invention, will have important potential in a variety of technological areas. The combination of the high degree of positional control, achieved through the inkjet deposition process, and control of the lasing emission characteristics, continuously selectable in the range 450-850 nm with very narrow linewidths,[8] permit further applications of the technology. Arrays of ink-jet printed LC lasers can also be combined with array-based pumping techniques[22] for the generation of multiple simultaneous lasers, of arbitrary wavelengths, within a single substrate. Of particular interest are security applications as described above, and lab-on-a-chip applications such as fluorescence tag-based bio-assays, for example, whereby arrays of independently configurable lasers can be printed into sample wells for simultaneous optical analysis.

The present inventors have demonstrated that the method of the present inventions can be used to create reproducible multiple low threshold single-mode laser devices by using precision inkjet deposition of a LC material, for example a LC lasing medium, onto a flowable material layer, for example a wet, solution-processible PVA film. Lasers printed in this way retain all the emission characteristics of samples confined within conventional glass cells that are pre-treated with rubbed polyimide alignment layers but with the simplicity and advantages of inkjet printing. A combination of interfacial interaction, promoting planar alignment of the LC director, and shear forces originating during the deposition process promote the standing helix alignment required for photonic band-edge lasing to occur normal to the substrate, e.g. the glass substrate, on which the flowable material is deposited.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

Non-patent literature referred to in the description:

[1] D. K. Yang, X. Y. Huang, Y. M. Zhu, *Annu Rev Mater Sci.* 1997, 27, 117.
[2] H. Coles, S. Morris, *Nat. Photonics.* 2010, 4, 676.
[3] P. J. Collings, M. Hird, *Introduction to liquid crystals: Chemistry and Physics*, Taylor and Francis, London 1997.
[4] V. I. Kopp, B. Fan, H. K. M. Vithana, A. Z. Genack, *Opt. Lett.* 1998, 23, 1707.
[5] C. Mowatt, S. M. Morris, M. H. Song, T. D. Wilkinson, R. H. Friend, H. J. Coles, *J. Appl. Phys.* 2010, 107, 043101.
[6] A. Chanishvili, G. Chilaya, G. Petriashvili, R. Barberi, R. Bartolino, G. Cipparrone, A. Mazzulla, R. Gimenez, L. Oriol, M. Pinol, *Appl. Phys. Lett.* 2005, 86, 051107.
[7] A. Chanishvili, G. Chilaya, G. Petriashvili, R. Barberi, R. Bartolino, G. Cipparrone, A. Mazzulla, L. Oriol, *Adv. Mater.* 2004, 16, 791.
[8] S. M. Morris, P. J. W. Hands, S. Findeisen-Tandel, R. H. Cole, T. D. Wilkinson, H. J. Coles, *Opt. Express.* 2008, 16, 18827.
[9] P. J. W. Hands, C. A. Dobson, S. M. Morris, M. M. Qasim, D. J. Gardiner, T. D. Wilkinson, H. J. Coles, "Wavelength-tuneable liquid crystal lasers from the visible to the near-infrared", presented at *Proc. SPIE,* 2011, 8114, 81140T
[10] K. Sonoyama, Y. Takanishi, K. Ishikawa, H. Takezoe, *Jpn. J. Appl. Phys.* 2. 2007, 46, 874.
[11] D. J. Gardiner, S. M. Morris, P. J. W. Hands, C. Mowatt, R. Rutledge, T. D. Wilkinson, H. J. Coles, *Opt. Express.* 2011, 19, 2432.
[12] P. J. W. Hands, D. J. Gardiner, S. M. Morris, C. Mowatt, T. D. Wilkinson, H. J. Coles, *Appl. Phys. Lett.* 2011, 98.
[13] S. M. Morris, A. D. Ford, B. J. Broughton, M. N. Pivnenko, H. J. Coles, "Liquid crystal lasers: Coherent and incoherent micro-sources", presented at *Proc. SPIE,* San Jose, Calif., 2005, 5741, 118
[14] K. K. B. Hon, L. Li, I. M. Hutchings, *CIRP Ann.,* 2008, 57, 601
[15] G. D. Martin, S. D. Hoath, I. M. Hutchings, *J. Phys. Conf. Ser.,* 2008, 105, 012001
[16] W. K. Hsiao, S. D. Hoath, G. D. Martin, I. M. Hutchings, *J. Imaging Sci. Technol.,* 2009, 53(5), 050304-1
[17] P. S. Drzaic, *Liquid Crystal Dispersions*, World Scientific, Singapore 1995.
[18] P. S. Drzaic, A. Muller, *Liq. Cryst.* 1989, 5, 1467
[19] P. S. Drzaic, R. Wiley, J. McCoy, *Proc. SPIE.* 1989, 1080, 41
[20] S. M. Morris, A. D. Ford, C. Gillespie, M. N. Pivnenko, O. Hadeler, H. J. Coles, *J. SID.* 2006, 14, 565.
[21] J. Schmidtke, W. Stille, *Eur. Phys. J. B.* 2003, 31, 179.
[22] P. J. W. Hands, S. M. Morris, T. D. Wilkinson, H. J. Coles, *Opt. Lett.* 2008, 33, 515.

The invention claimed is:

1. A method of manufacturing a security feature for identifying objects or documents of value, the method comprising:
   encoding information in a pattern; and
   ink jet printing a chiral nematic liquid crystal material from a reservoir using a print head on to a substrate in the pattern to form a patterned array of chiral nematic liquid crystal material deposits, wherein the print head, or the reservoir, or both, is heated to a temperature above the clearing point of the chiral nematic liquid crystal material, and wherein the chiral axes of the chiral nematic liquid crystal material deposits are aligned substantially perpendicular to the substrate such that a predetermined portion of the electromagnetic spectrum is selectively reflected over other regions of the electromagnetic spectrum by the chiral nematic liquid crystal material deposits.

2. The method according to claim 1, wherein the pattern is a two-dimensional pattern.

3. The method according to claim 1, wherein the print head is heated to a temperature above the clearing point of the chiral nematic liquid crystal material.

4. The method according to claim 1, wherein the reservoir is heated to a temperature above the clearing point of the chiral nematic liquid crystal material.

5. The method according to claim 1, wherein the print head and the reservoir are heated to a temperature above the clearing point of the chiral nematic liquid crystal material.

6. The method according to claim 1, wherein the predetermined portion of the spectrum is selected to reflect a known portion of the spectrum created by a device equipped with an LED light source where otherwise the material possesses only low visibility to the unaided eye.

7. The method according to claim 1, wherein the chiral nematic liquid crystal material includes a fluorescence dye, a fluorescent laser dye, a quantum dot, or other light harvester or gain additives.

* * * * *